(12) United States Patent
Schimpf

(10) Patent No.: US 10,917,044 B2
(45) Date of Patent: Feb. 9, 2021

(54) PHOTOVOLTAIC WIRE MANAGEMENT SYSTEM

(71) Applicant: SCH LLC, Provo, UT (US)

(72) Inventor: Brady Schimpf, Provo, UT (US)

(73) Assignee: SCH LLC, Provo, UT (US)

( * ) Notice: Subject to any disclaimer, the term of this patent is extended or adjusted under 35 U.S.C. 154(b) by 0 days.

(21) Appl. No.: 16/983,800

(22) Filed: Aug. 3, 2020

(65) Prior Publication Data

US 2020/0366238 A1    Nov. 19, 2020

Related U.S. Application Data

(63) Continuation-in-part of application No. 16/030,343, filed on Jul. 9, 2018, now Pat. No. 10,742,007.

(60) Provisional application No. 62/530,053, filed on Jul. 7, 2017.

(51) Int. Cl.
*H02G 3/04* (2006.01)
*H02S 40/36* (2014.01)
*H02S 30/10* (2014.01)

(52) U.S. Cl.
CPC ............. *H02S 40/36* (2014.12); *H02G 3/045* (2013.01); *H02G 3/0406* (2013.01); *H02S 30/10* (2014.12)

(58) Field of Classification Search
CPC ........ H02G 3/045; H02G 3/0456; H02G 3/00; H02G 3/02; H02G 3/0437; H02G 3/04; H02S 30/10; H02S 40/30; H02S 40/36; H02S 30/00; H01L 31/042

USPC ........... 174/480, 481, 503, 68.1, 68.3, 72 A, 174/88 R, 70 C, 95; 248/49, 68.1, 73, 248/74.1; 385/134, 135
See application file for complete search history.

(56) References Cited

U.S. PATENT DOCUMENTS

| | | | |
|---|---|---|---|
| 2,023,433 A | 12/1935 | McConnell | |
| 6,380,484 B1 | 4/2002 | Theis et al. | |
| 6,460,812 B1 | 10/2002 | Jette | |
| 6,972,367 B2 | 12/2005 | Federspiel et al. | |
| 7,049,508 B2 | 5/2006 | Bushey et al. | |
| 7,381,899 B2 | 6/2008 | Pfluger | |
| 8,985,530 B2 | 3/2015 | Jette | |
| 9,671,046 B2 | 6/2017 | Whipple et al. | |
| 9,800,028 B1 | 10/2017 | Smith et al. | |
| 10,742,007 B2 * | 8/2020 | Schimpf | ................ H02G 3/045 |

OTHER PUBLICATIONS

Non-Final Office Action dated Oct. 21, 2019 for U.S. Appl. No. 16/030,343.

(Continued)

*Primary Examiner* — Angel R Estrada
(74) *Attorney, Agent, or Firm* — Law Offices of Damon L. Boyd, PLLC

(57) ABSTRACT

A wire management duct having is provided with a wire channel along the length of the duct. In an embodiment, the duct is further comprising a mounting lip to mount the duct onto a mounting rail of photovoltaic array mounting rail system. In another embodiment, a wire management system is comprised of one or more wire management ducts which may be mounted parallel to the mounting rails of photovoltaic array mounting rail system or perpendicular to the rails using an attachment clip. In a further embodiment, mounting clips are provided to attach the wire management ducts directly to the frame of a photovoltaic module.

27 Claims, 33 Drawing Sheets

(56) References Cited

OTHER PUBLICATIONS

Mar. 19, 2020 Reply to Non-Final Office Action dated Oct. 21, 2019 for U.S. Appl. No. 16/030,343.
Notice of Allowance and Issue Fee Due dated Apr. 7, 2020 for U.S. Appl. No. 16/030,343.
Issue Fee Payment dated Jun. 6, 2020 for U.S. Appl. No. 16/030,343.

* cited by examiner

PHOTOVOLTAIC WIRE MANAGEMENT SYSTEM

CROSS-REFERENCE TO RELATED APPLICATION

The present application claims priority to U.S. Provisional Patent Application No. 62/530,053 filed on Jul. 7, 2017, entitled "Module-Attached PV Wire Management Tray" and U.S. patent application Ser. No. 16/030,343 filed on Jul. 9, 2018, entitled "Photovoltaic Wire Management System," the entire disclosure of which is incorporated by reference herein.

BACKGROUND OF THE INVENTION

Photovoltaic (PV) solar arrays are typically comprised of optimizers and microinverters, commonly called Module Level Power Electronics (MLPEs) and PV Modules which are secured with structures called racking. Racking systems may include rails which support the modules or attach directly to module frames without rails. Most rooftop racking systems are designed to mount arrays with a low profile and minimal clearance from the surface to which they are attached.

Most PV components interface with standardized components, such that different brands of modules, MLPEs, racking, and wire management devices can be combined into a complete PV system. Typically, cables are terminated with industry standard connectors and are factory-connected inside the modules and MLPEs. The cables are connected and run under the modules, both parallel and perpendicular to mounting rails. In some scenarios, cables with custom lengths and matching connectors are made on-site. Both factory connected cables and cables created on site are secured so that they do not hang loose, sag, or come into contact with damaging or abrasive surfaces. The act of securing these cables is commonly referred to as "wire management."

One common industry practice is to use zip ties or wire clips to secure wires to module frames or rails. This practice is time-consuming, lacks longevity and can easily damage the conductors. Plastic zip ties, even UV resistant versions, degrade and break with the intense UV and heat exposure common in PV solar arrays. Metal zip ties are an alternative but have sharp edges that can cut into and damage cables. Furthermore, this practice is time-consuming and requires installers to pick up, properly orient and attach small components.

All of these means of wire attachment/securing require technicians to install conductors under tension to ensure the portions spanning between attachments stay above the roof surface and do not sag. To maintain this tension, installers often pull the wires around racking components, which can abrade and cut into the wire. However, the wires are subject to thermal expansion which can significantly change the length of the wires. For example, if the wires are installed under tension on a warm day, they can shrink and pull out of the wire clip attachments in cold weather. In extreme situations, conductors can even pull out of the electrical connectors resulting in arcing, and electrical hazards.

There are various other PV wire management devices such as "Hanging Wire Ways", "Racking Integrated" or "Rail Integrated" wire management devices. Each of these devices are difficult to install, are cost prohibitive, or require custom modules or racking. Some rails and modules have integrated wire management features, but they are not compatible to manage wires sets running perpendicular to the mounting rail. Furthermore, they lack industry standard interfacing features, which locks consumers into a specific brand.

Cable Ways are a common product used in the electrical industry. These trays are large-scale and designed for used in large commercial and industrial applications. They typically mount to structures, struts, or hangers. MP Husky, Legrand, Cooper Industries are all companies that produce cable trays. However, these trays cannot attach directly to rails and module frames, cannot clamp and secure a cable exiting the device, and do not fit in the space under standard rooftop racking systems. Therefore, they are not ideal for managing cables running under modules to connect components within the array. There are Cable Ways designed specifically for use on PV solar arrays, but they interfere with racking/mounting components when used within the array.

What is needed is a wire management system in which cables can be laid and secured without tension or contact with sharp edges, a universal system compatible with all PV modules, and a system which mounts to the module frame or mounting rails without interfering with common racking/mounting systems and MLPEs. What is further desired is a wire management system which is durable and protects the wires placed within the system.

SUMMARY OF THE INVENTION

In accordance with various non-limiting and exemplary embodiments, the present disclosure comprises devices, systems and methods for managing the wires in photovoltaic systems. For example, a wire management system may comprise a wire management duct having a length and a wire channel provided along the length and configured to hold a plurality of wires. The wire channel may further comprise a channel wall, a first opening catch having a first opening catch radius and a second opening catch having a second opening catch radius, and an opening provided between the channel wall and the first opening catch and the second opening catch. A portion of the wire channel may be formed by a first arc having a first radius and the first radius is larger than the first opening catch radius and the second opening catch radius. In accordance with the present disclosure, the wire management system comprises an attachment clip that connects to the wire management duct via the attachment clip connection mechanism. The foregoing, and other features and advantages of the invention, will be apparent from the following, more particular description of the embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF EMBODIMENTS

Figure 1:
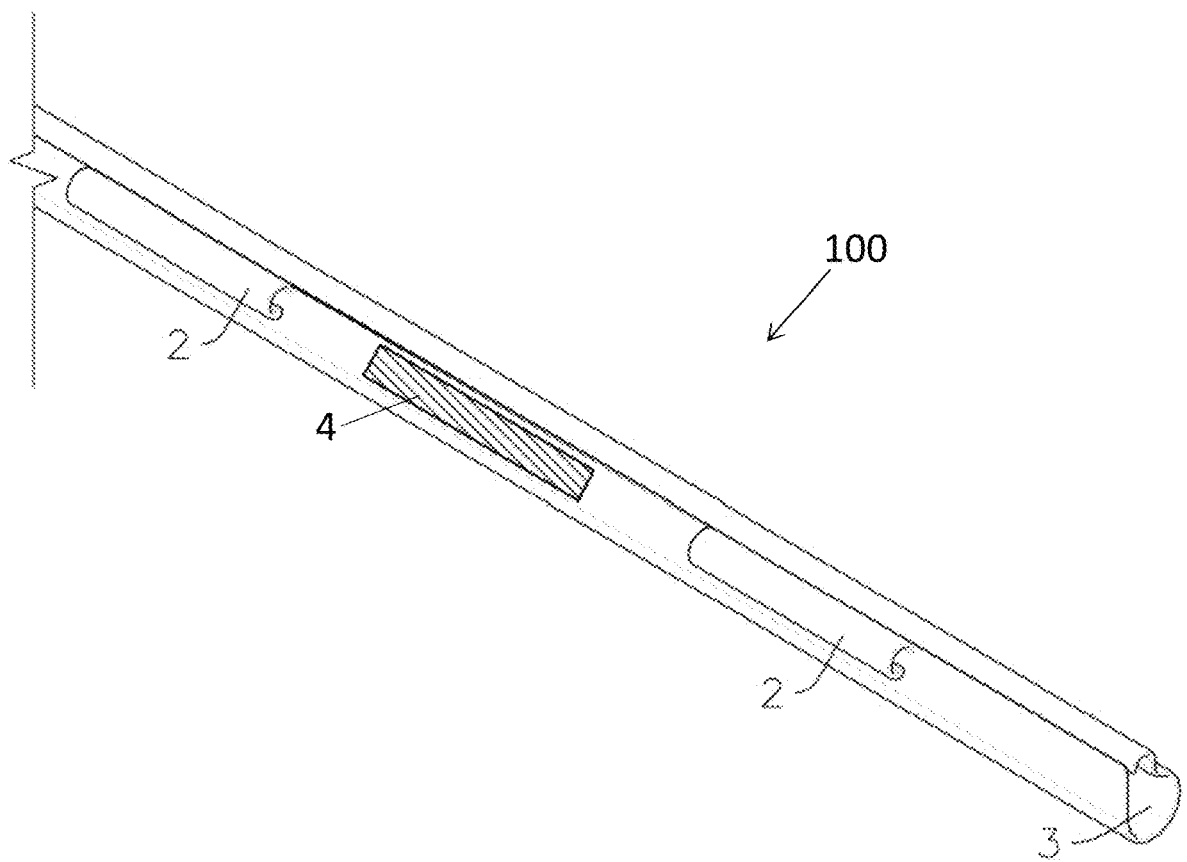
FIG. 1 is a perspective view of the photovoltaic wire management system, according to an embodiment of the present invention.

Embodiments of the present invention and their advantages may be understood by referring to FIGS. 1-29, wherein like reference numerals refer to like elements. Additionally, terms such as "radius" and "curve" are used herein to describe certain aspects of the devices contemplated herein. Though these terms are used in their traditional sense to include smooth radii and curves, it should be understood that for purposes of the present disclosure, these term can contemplate a variety of geometric shapes, including smooth, straight and angular, and the disclosure and claims should not be construed to be limited to only the traditional meaning of these terms.

Figure 2:
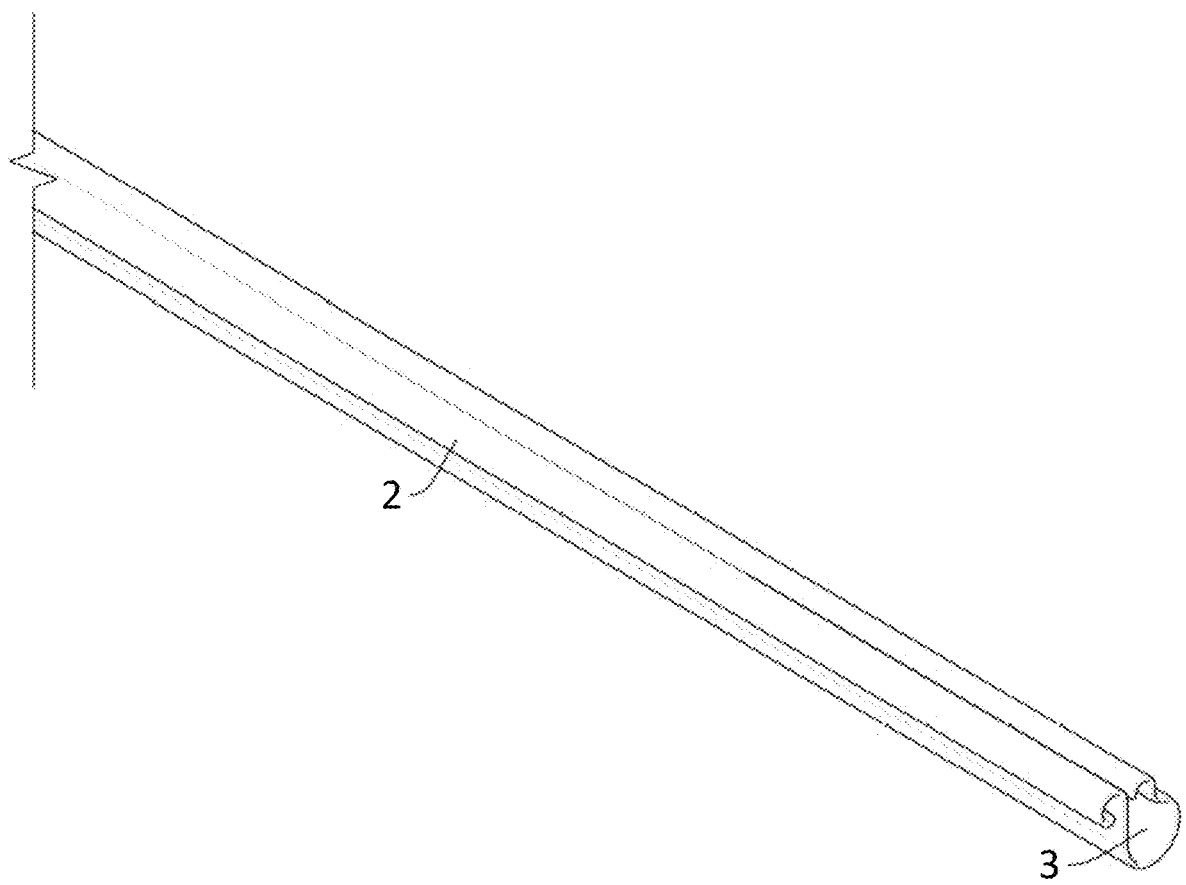
FIG. 2 is a perspective view of the photovoltaic wire management system, according to an embodiment of the present invention.

In reference to FIGS. 1-2, an embodiment of the wire management system is shown wherein a wire management duct 100 is comprised of a mounting lip 2 and a wire channel 3. The duct can vary in length but is typically installed to run the entire length of the Photovoltaic (PV) module frames or mounting rails.

Figure 4:
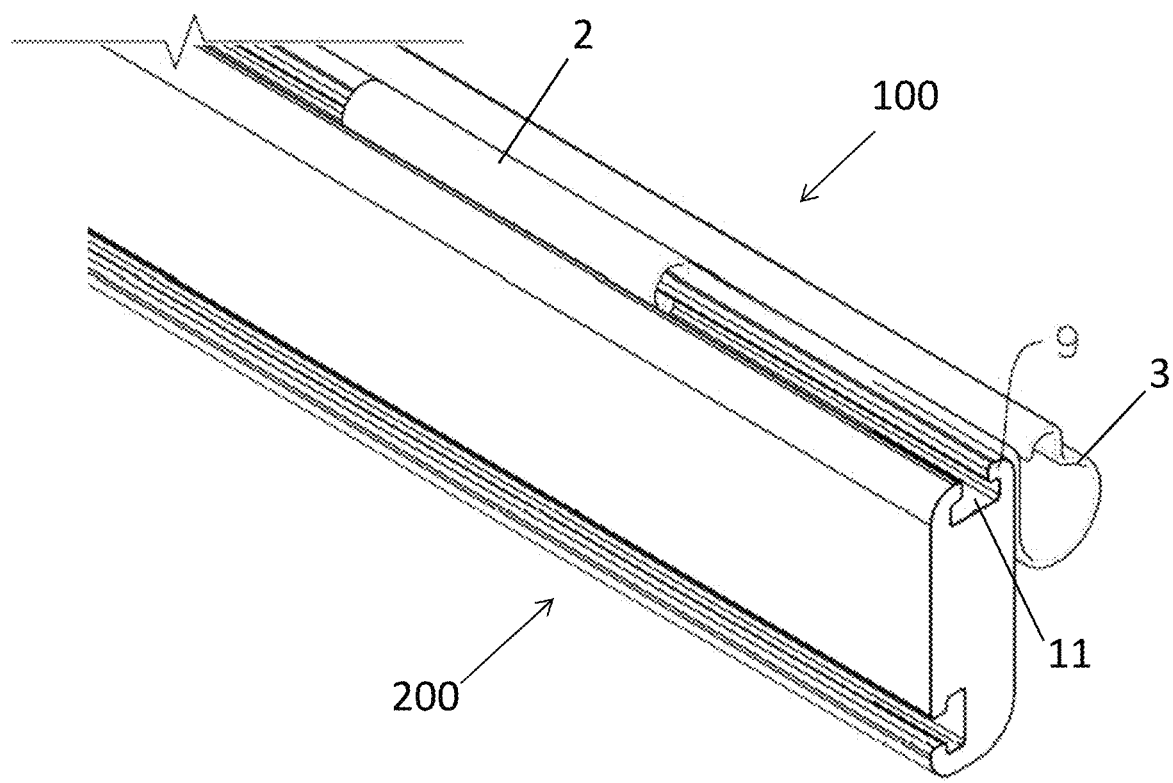
FIG. 4 is a perspective view of the photovoltaic wire management system, according to an embodiment of the present invention.

In an embodiment, the mounting lip 2, is provided to attach the duct to a rail mounting slot of a PV mounting rail (as shown in FIG. 4). In the embodiment shown in FIG. 1, multiple mounting lips 2 are provided along sections of the duct. In the embodiment shown in FIG. 2, a continuous mounting lip 2 is provided along the length of the duct.

Figure 3:
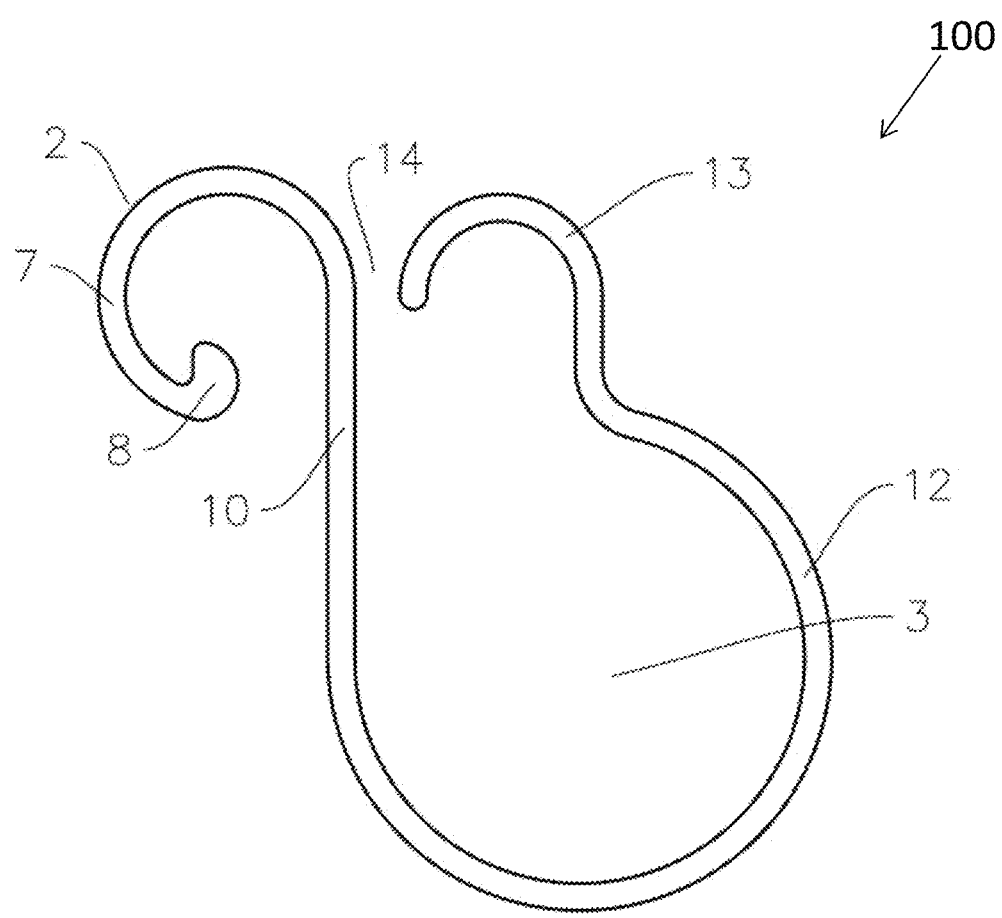
FIG. 3 is a side view of the photovoltaic wire management system, according to an embodiment of the present invention.

With reference to FIG. 3, an embodiment of the wire management system is shown wherein a wire management duct 100 is comprised of a mounting lip 2 and a wire channel 3. In an embodiment, the mounting lip 2 is comprised of a curved section 7 which terminates at a hook 8. In an embodiment, the curved section is provided as an arc maintaining a constant radius. The hook 8 is configured to engage with a ledge of a rail mounting slot (9 as shown in FIG. 4).

With further reference to FIG. 3, according to an embodiment, the wire channel 3 comprises a channel wall 10. In an embodiment, the channel wall 10 is provided as a straight portion which may rest against the rail when in a parallel with the rail. In an embodiment, the channel wall 10 may be provided with an adhesive backing for mounting (shown as 4 in FIG. 1).

In an embodiment, the wire channel 3 is further comprised of bottom portion 12 formed by a large curve radius, and an opening catch 13 formed by a smaller curve radius. An opening 14 is provided to accept wires or cables into the wire channel 3. In an embodiment, the curved segments of opening catch 13 and the curved section 7 of the mounting lip 2 allow for wires to easily pass through the opening 14. Furthermore, the opening catch 13 of the wire channel 3 is curved to prevent wires or cables from accidentally falling out of the wire channel.

In an exemplary embodiment, with reference to FIG. 3, the wire management duct 100 the outer dimensions of the cross-sectional portion where a mounting lip 2 is approximately 33 millimeters (mm) high by 33 mm wide. In an embodiment, the curved section 7 of the mounting lip 2 has a constant radius of curvature of approximately 4.5 mm. The hook 8 is provided with a radius of about 1.8 mm and protrudes 2 mm from the terminal end of the curved section 7. The end of the hook is spaced about 4 mm from the channel wall 10. In an embodiment, bottom portion 12 of the wire channel 3 has a constant radius of about 10 mm. The opening catch is provided with a constant radius of about 3.3 mm. In the exemplary embodiment, the space provided between the curved segments of opening catch 13 and the curved section 7 to provide is about 2 mm to form the opening 2. In an embodiment, the thickness of material which forms the duct is about 1.2 mm.

In reference to FIG. 4, an embodiment of the wire management system is shown, wherein a wire management duct 100 is mounted to a mounting rail 200. In the embodiment, the mounting lip(s) 2 of the wire management duct are engaged with a ledge 9 of the rail slot 11 such that the hook of the mounting lip(s) (shown as 8 in FIG. 3) catches on the ledge 9. In the embodiment, the hook 8 has a shape and size to act as a wedge and smoothly engage the ledge 9. The elasticity of the curved section 7 of the mounting lip 2 provides tension to push the hook 8 inwards, decreasing the distance between the hook and channel body, as the nub slides down past the ledge 9 and into the rail mounting slot 11 to lock the duct into place.

Figure 5:
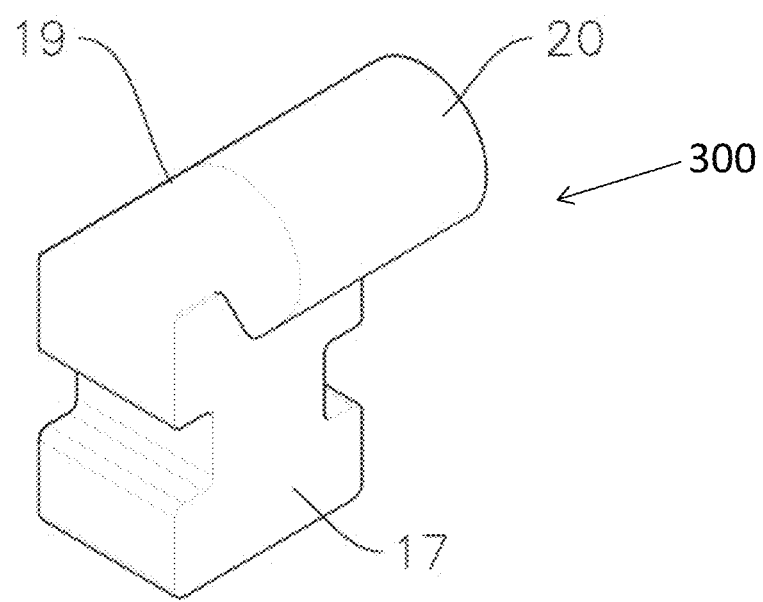
FIG. 5 is a perspective view of an attachment clip of the photovoltaic wire management system, according to an embodiment of the present invention.
Figure 6:
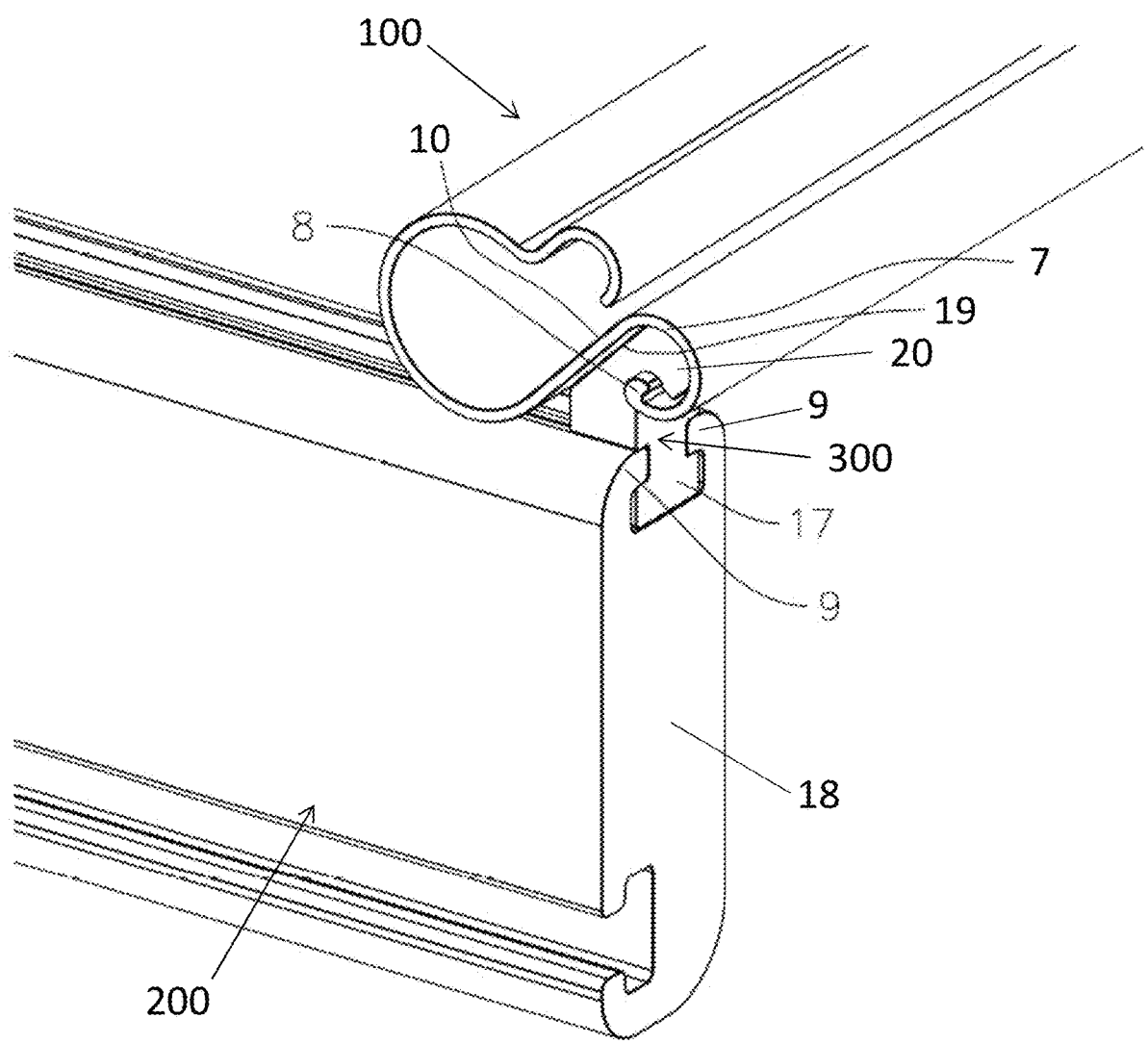
FIG. 6 is a perspective view of an attachment clip the photovoltaic wire management system in use, according to an embodiment of the present invention.

In reference to FIGS. 5-6, an embodiment of a perpendicular attachment clip 300 component is shown. The clip 300 is provided with a rail slot adapter 17 and a duct adapter 20. In the embodiment, the rail slot adapter 17 is provided to be inserted into a rail slot of a rail mounting system 200. The duct adapter 20 is provided to engage the mounting lip 2 of the wire management duct 100. In an embodiment, the clip 300 is further provided with an angled support shelf 19, to support the channel wall 10 of the wire management duct 100.

With reference to FIG. 6, an embodiment of the perpendicular attachment clip 300 is shown, wherein the rail slot adapter 17 of the clip has been slid into an end 18 of a rail mount 200. The clip may be placed anywhere along the length of the rail slot and will be held in place by the ledges 9.

Figure 7:
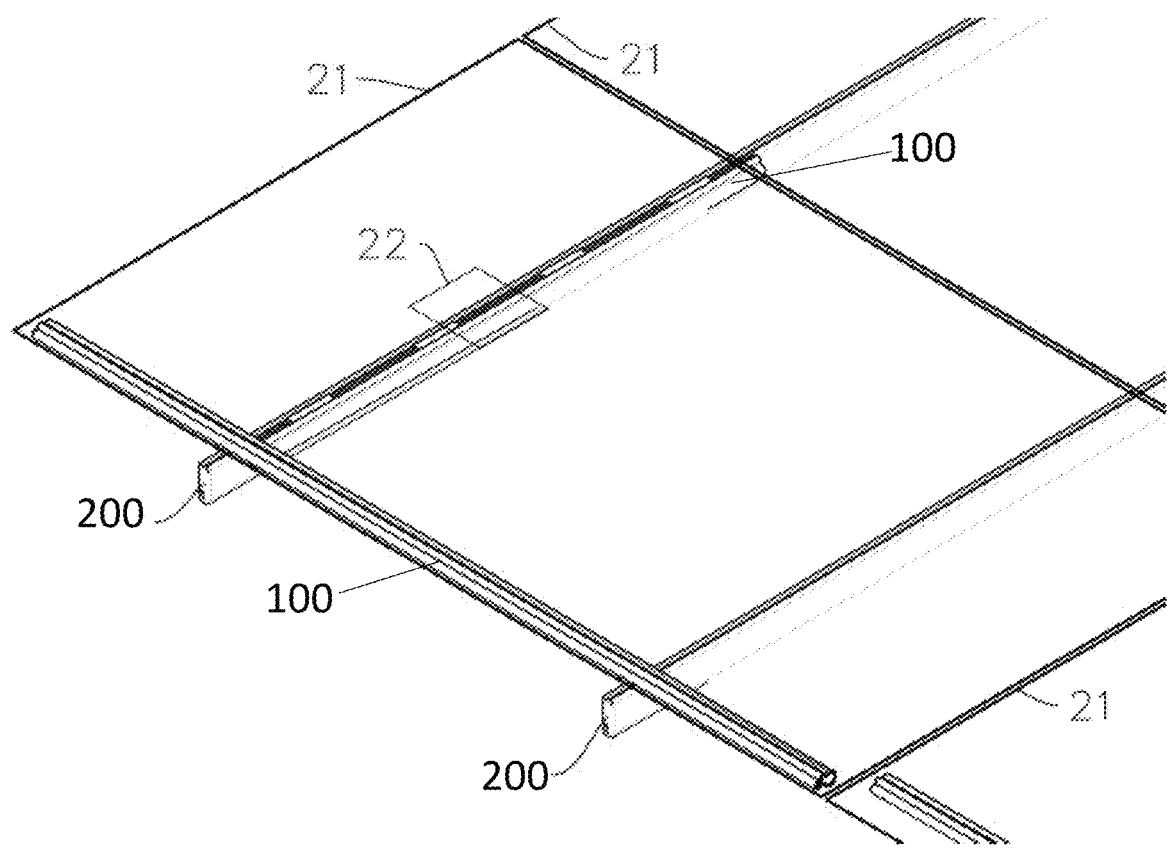
FIG. 7 is a perspective view of the photovoltaic wire management system in use, according to an embodiment of the present invention.

With reference to FIG. 7, an embodiment of the photovoltaic wire management system is shown in use. In the embodiment, a typical photovoltaic array is shown comprised of modules 21, Module Level Power Electronics 22, and mounting rails 200. In the embodiment, wire management ducts 100 are provided to house the cables and wires of the array and are oriented both perpendicular and parallel to the mounting rails 200.

Figure 8:
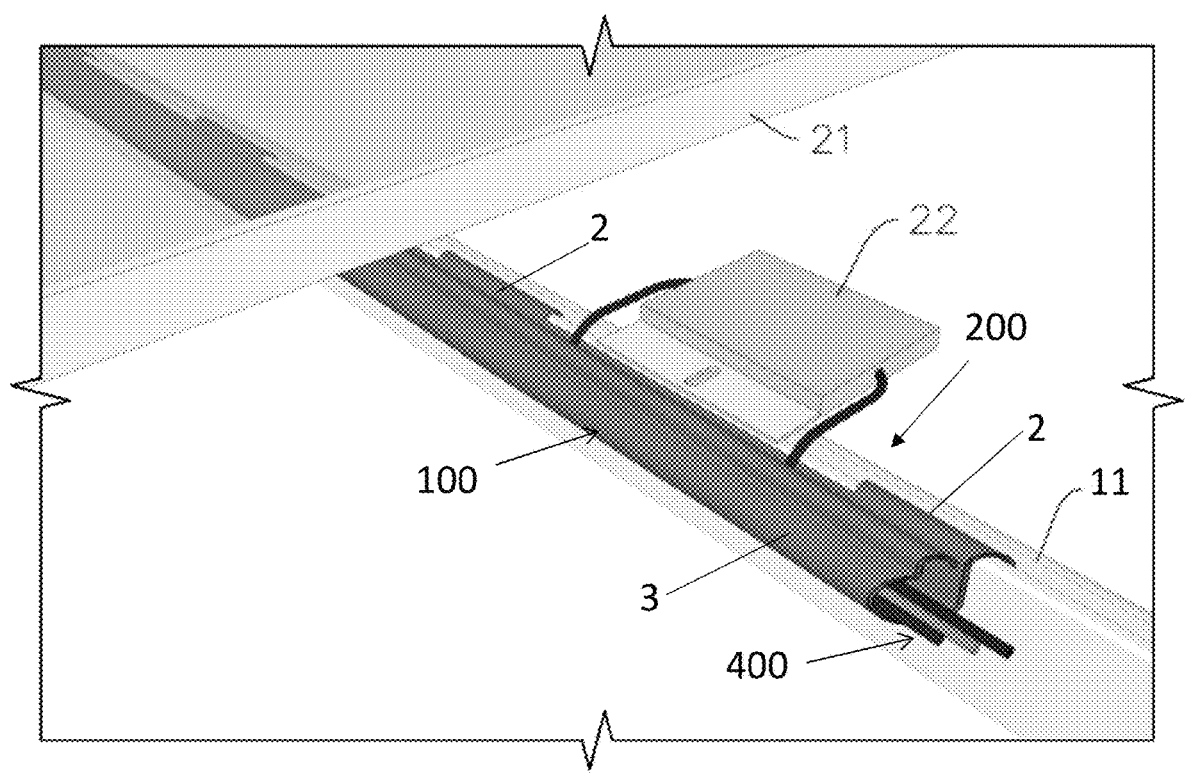
FIG. 8 is a perspective view of the photovoltaic wire management system in use, according to an embodiment of the present invention.

With reference to FIG. 8, an embodiment of the photovoltaic wire management system is shown in use. In the embodiment, a typical photovoltaic array is shown comprised of modules 21, Module Level Power Electronics 22, and mounting rails 200. A wire management duct 100 is mounted onto the mounting rail 200 via the mounting lip 2 engaging with a ledge of the rail slot 11. Wire channel 3 provides protection and support for one or more wires or cables 400. In the embodiment shown, the wire management duct 100 is provided with multiple mounting lips 2, such that a space provided between the mounting lips to accommodate MLPEs or other PV array components which also attach to the mounting rail 200.

Figure 9:
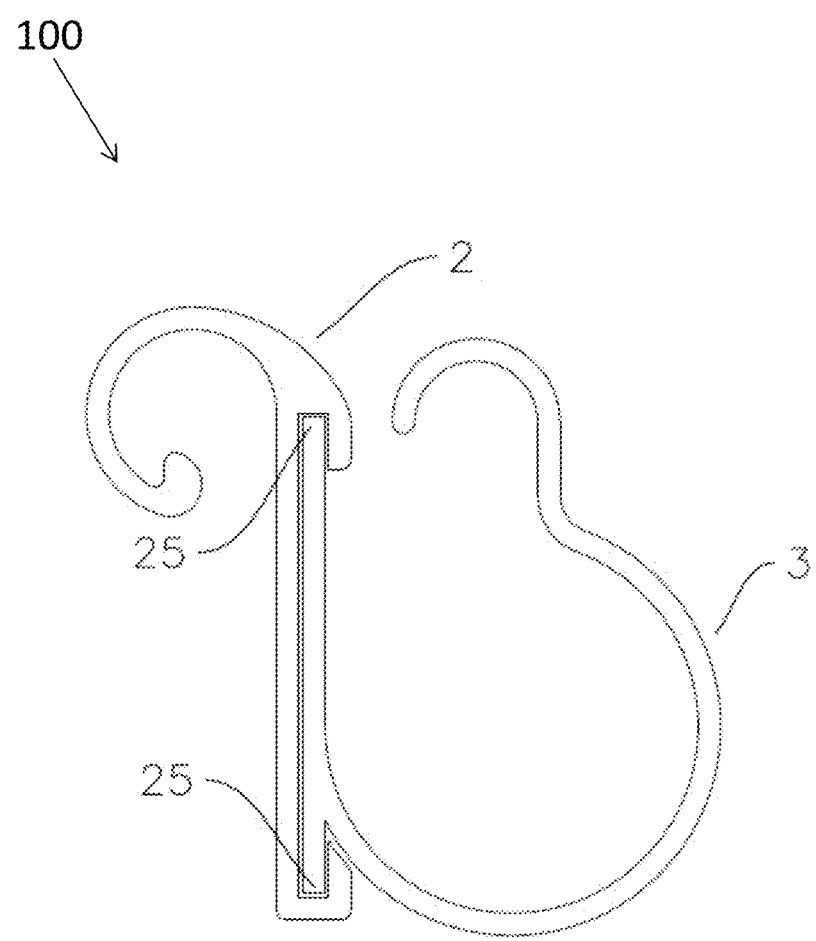
FIG. 9 is a side view of the photovoltaic wire management system, according to an embodiment of the present invention.

With reference to FIG. 9, an embodiment of the wire management duct 100 is shown wherein the mounting lip 2 and the wire channel 3 are provided as separate components. In the embodiment, the wire channel is provided with tabs 25 to be received by grooves provided by the mounting lip component 2. The embodiment allows the attachment to be moved to different points along the device to avoid interference with frame-attached module level power electronics and other components.

Figure 10:
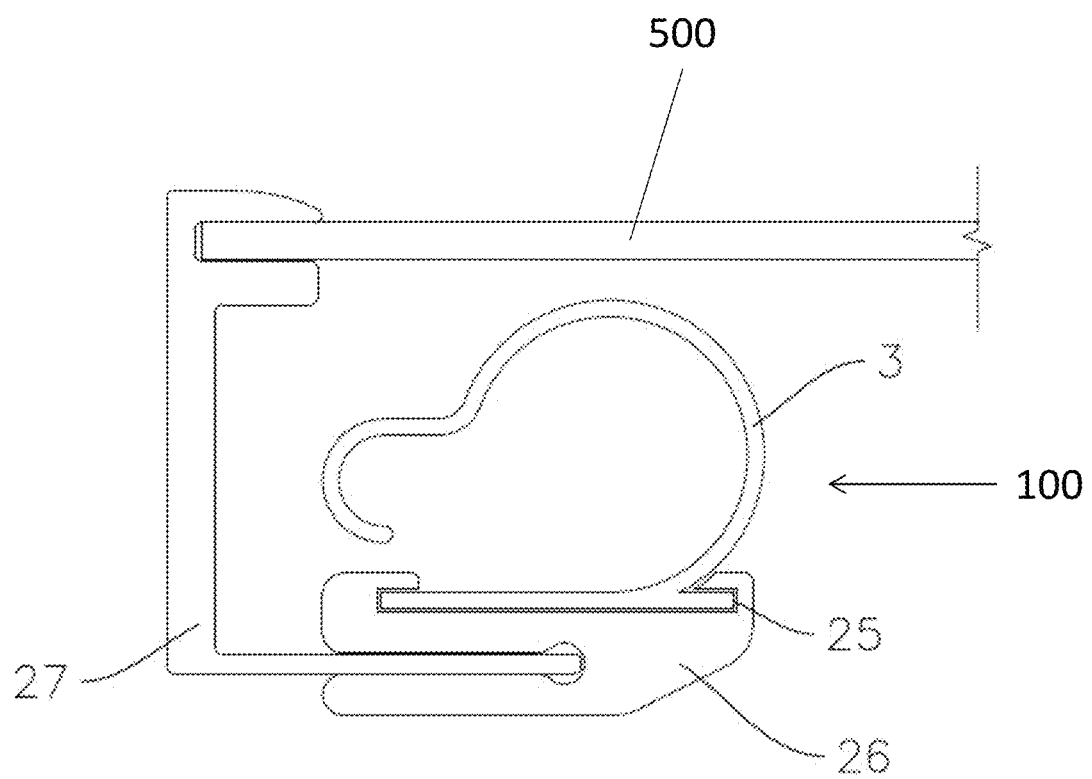
FIG. 10 is a side view of the photovoltaic wire management system, according to an embodiment of the present invention.
Figure 11:
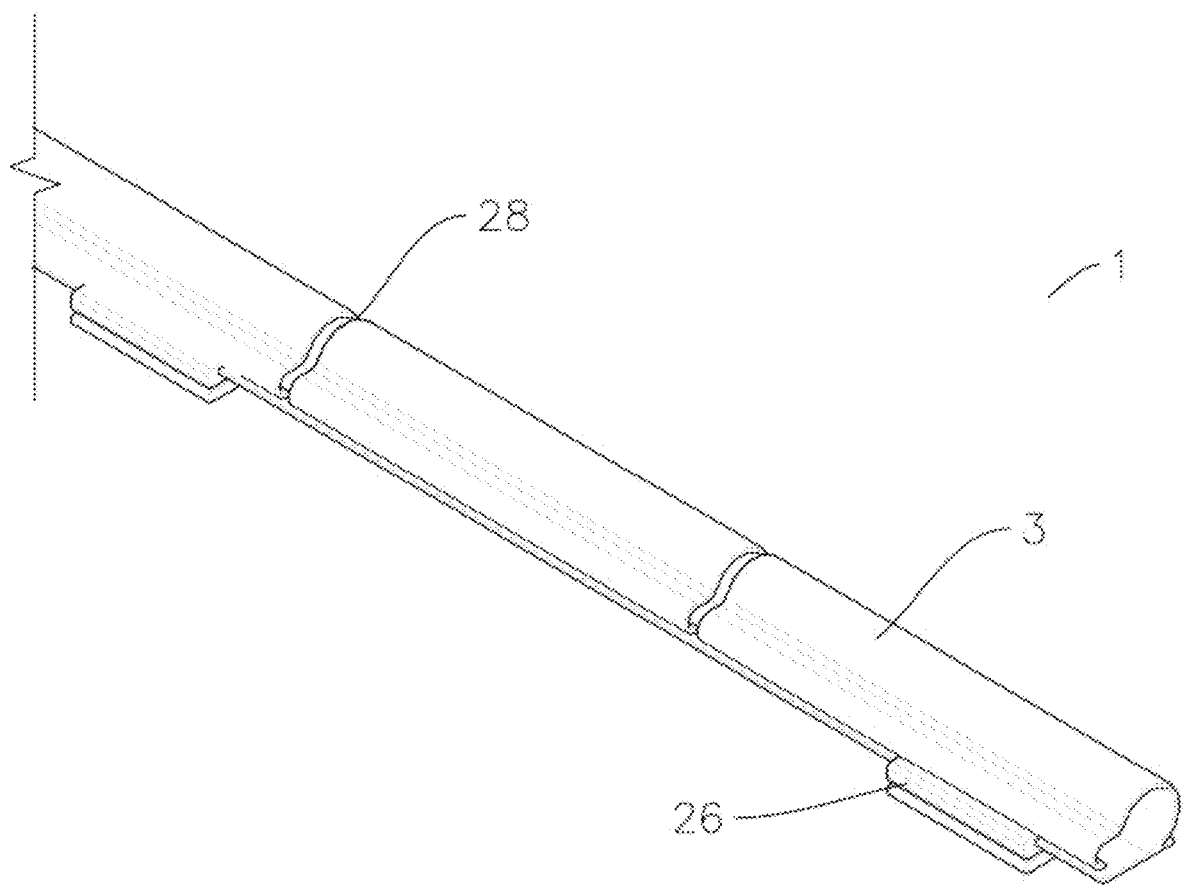
FIG. 11 is a perspective view of the photovoltaic wire management system according to an embodiment of the present invention.

With reference to FIGS. 10-11, an embodiment of the wire management duct 100 is shown. In the embodiment, the wire channel 3 is provided with tabs 25 to be received by grooves provided by a mounting clip 26. In an embodiment, the mounting clip attaches to the frame 27 of a photovoltaic array module 21. The mounting clip 26 may be constructed of metal or other material and fixed in place on the wire channel.

In an embodiment, with reference to FIG. 11, the wire channel 3 is provided with one or more slotted cutouts 28 (or simply, "slots"). The slots provide an alternative opening to allow wires and cables to enter and exit the channel in a direction more conducive with module attached wire management. In an embodiment, the wire duct is comprised of a flexible material and the slots 28 better allow the duct to be coiled, packed, and bent around corners.

Figure 12:
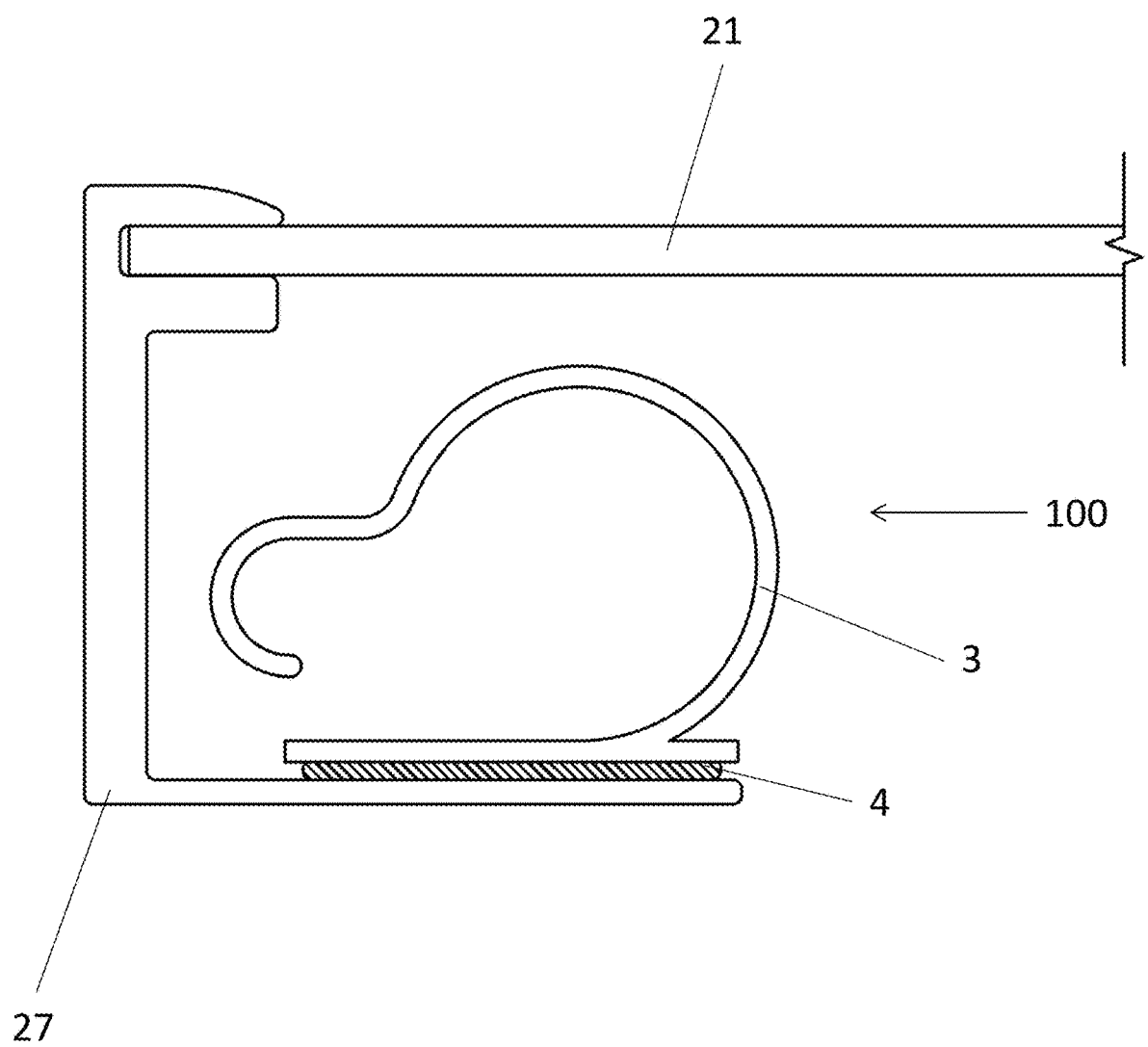
FIG. 12 is a side view of the photovoltaic wire management system, according to an embodiment of the present invention.

With reference to FIG. 12, in an embodiment, the wire duct 100 may be secured to the module frame 27 with an adhesive or adhesive backing 4. In an embodiment, integrated spacers are provided to elevate the channel above drain holes provided in the module frame 27.

Figure 13:
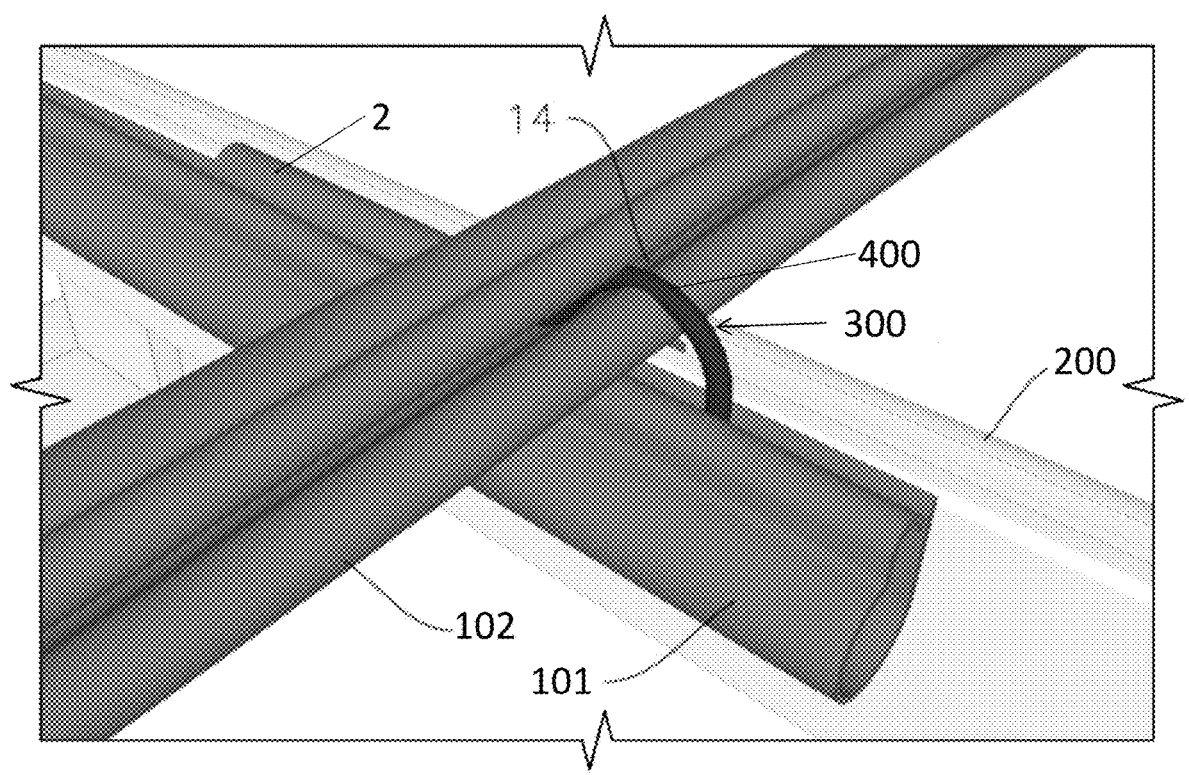
FIG. 13 is a perspective view of the photovoltaic wire management system in use, according to an embodiment of the present invention.

In reference to FIG. 13, an embodiment of the wire management system is shown in use. In the embodiment, a wire duct 101 is mounted parallel to a mounting rail 200 via a mounting lip 2 engaging with a ledge of the rail slot. A second wire duct 102 is mounted perpendicular to the mounting rail 200 by a perpendicular attachment clip 300. The clip 300 is received at one end by the rail slot, and at the other end by the mounting lip of duct 102. FIG. 12 further depicts a cable 400 which is provided in both wire channel of duct 101 and inserted into the opening 14 of the wire channel of duct 102.

Figure 14:
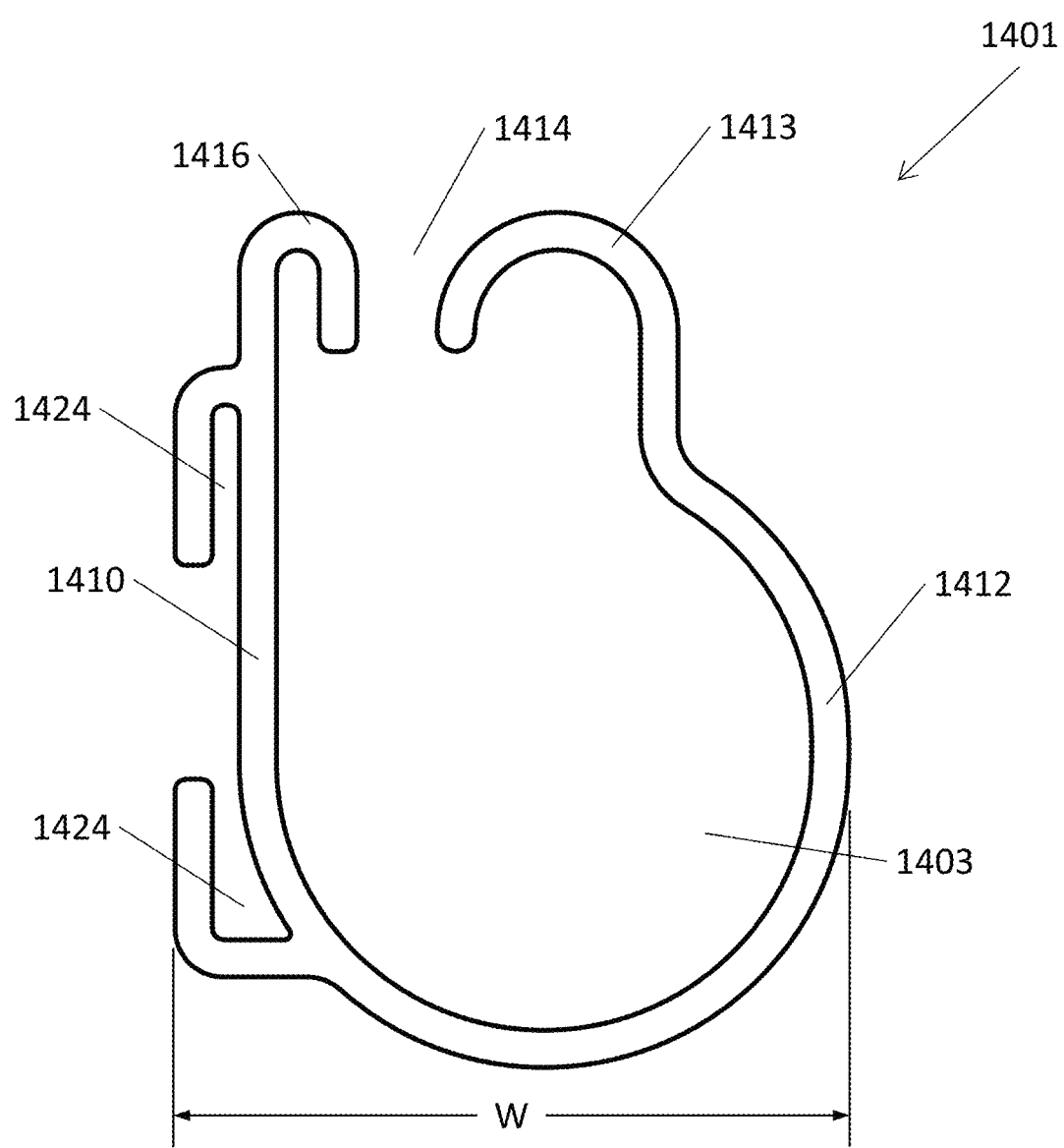
FIG. 14 is a side view of a wire duct of the photovoltaic wire management system, according to an embodiment of the present invention.

In reference to FIG. 14, an embodiment of the wire management duct 1401 is shown wherein the mounting mechanism and the wire channel are separate components. In this embodiment, the wire channel wall 1410 is provided with grooves 1424 to receive the tabs of a mounting component (such as a clip). The wire channel 1403 is provided with a first opening catch 1413 and a second opening catch 1416 with an opening 1414 between the catches. The curved opening catches allow wires to easily pass through the opening. Furthermore, the curved opening catches form a hook on the interior of the wire channel 1403 to prevent wires or cables from accidentally falling out of the channel 1403. In accordance with various aspects of the present disclosure, in order to fit into the space between the lower flange of the frame and the backsheet of a conventional photovoltaic module (commonly called a "solar panel"), the overall width (W) of the wire management duct 1401 is less than about 25 mm.

In continuing reference to FIG. 14, a bottom portion 1412 of the wire channel is formed by a large curve radius and the opening catch 1413 is formed by a smaller curve radius are constructed of such a material and thickness so as to form a flexible spring-like structure that flexes outwards, increasing the size of the opening 1414. As wires or cables are inserted into the opening, the elasticity of the structure causes it to flex back towards its original position, applying inward pressure to retain and secure the wires. This structure provides a means for the wires to span from their point of origin on modules or MLPE, to the wire management system without sagging or secondary means of securement.

Figure 15:
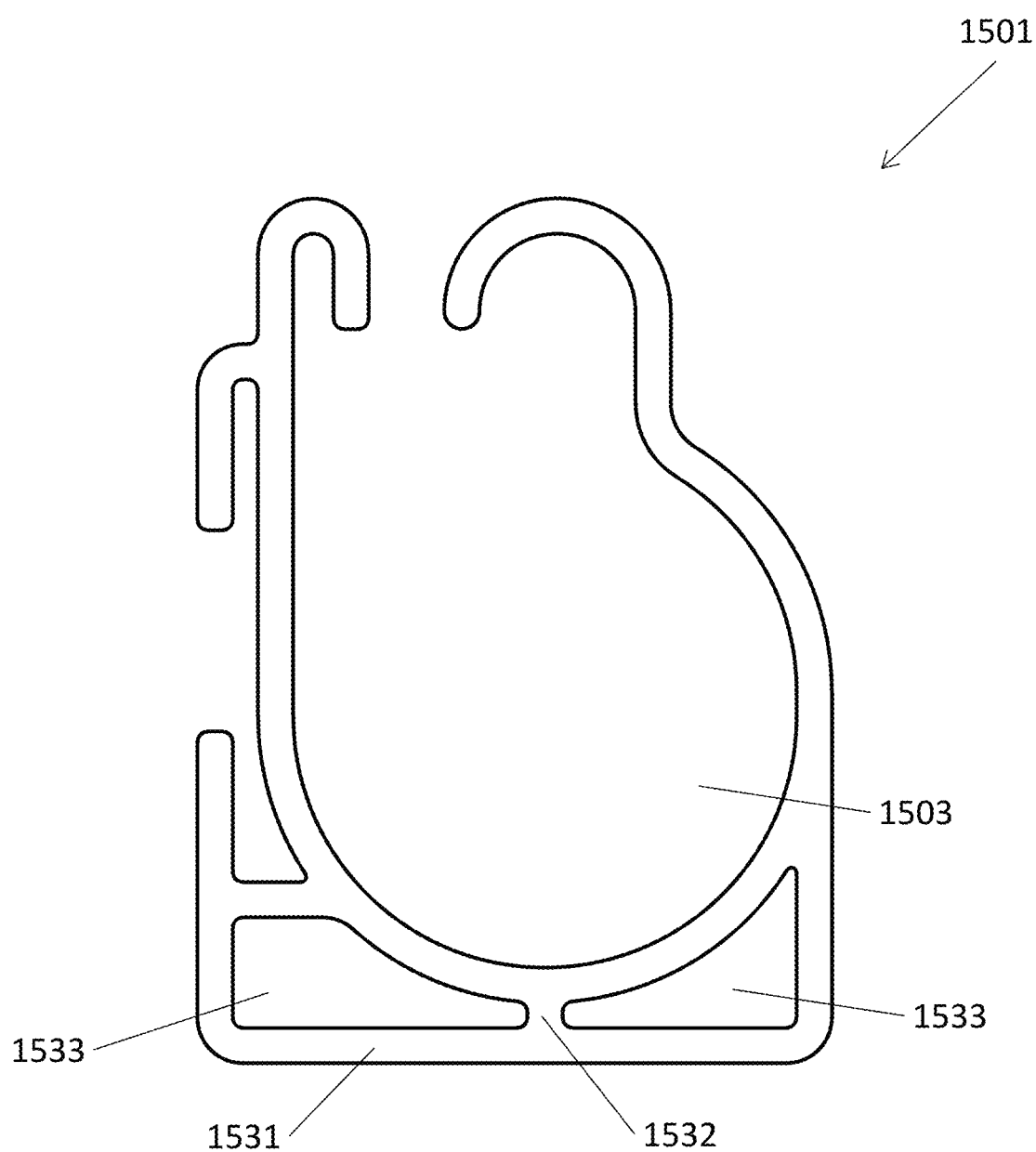
FIG. 15 is a side view of a wire duct of the photovoltaic wire management system, according to an embodiment of the present invention.

With reference to FIG. 15, another embodiment of the wire management duct 1501 is shown wherein the wire channel 1503 is provided with a truss-like support structure 1531 and/or thickened sections which may add strength and rigidity to the duct. In an embodiment, the support structure 1531 may be provided with one or more connecting chords 1532 that split the structure into multiple voids 1533. In an embodiment, the structure 1531 may have a single void with no connecting chords.

In accordance with various aspects of the present disclosure, and attachment clip connection mechanism is provided. For example, with reference to FIGS. 16-18, embodiments of a mounting clip component 1626 are shown. The mounting clip is provided with a disk-like tab 1625 that engages the attachment clip connection mechanism in the form of grooves in the wire management duct. The tab may be circular or square. In various alternative embodiments, the tabs and grooves may be reversed.

Figure 16:
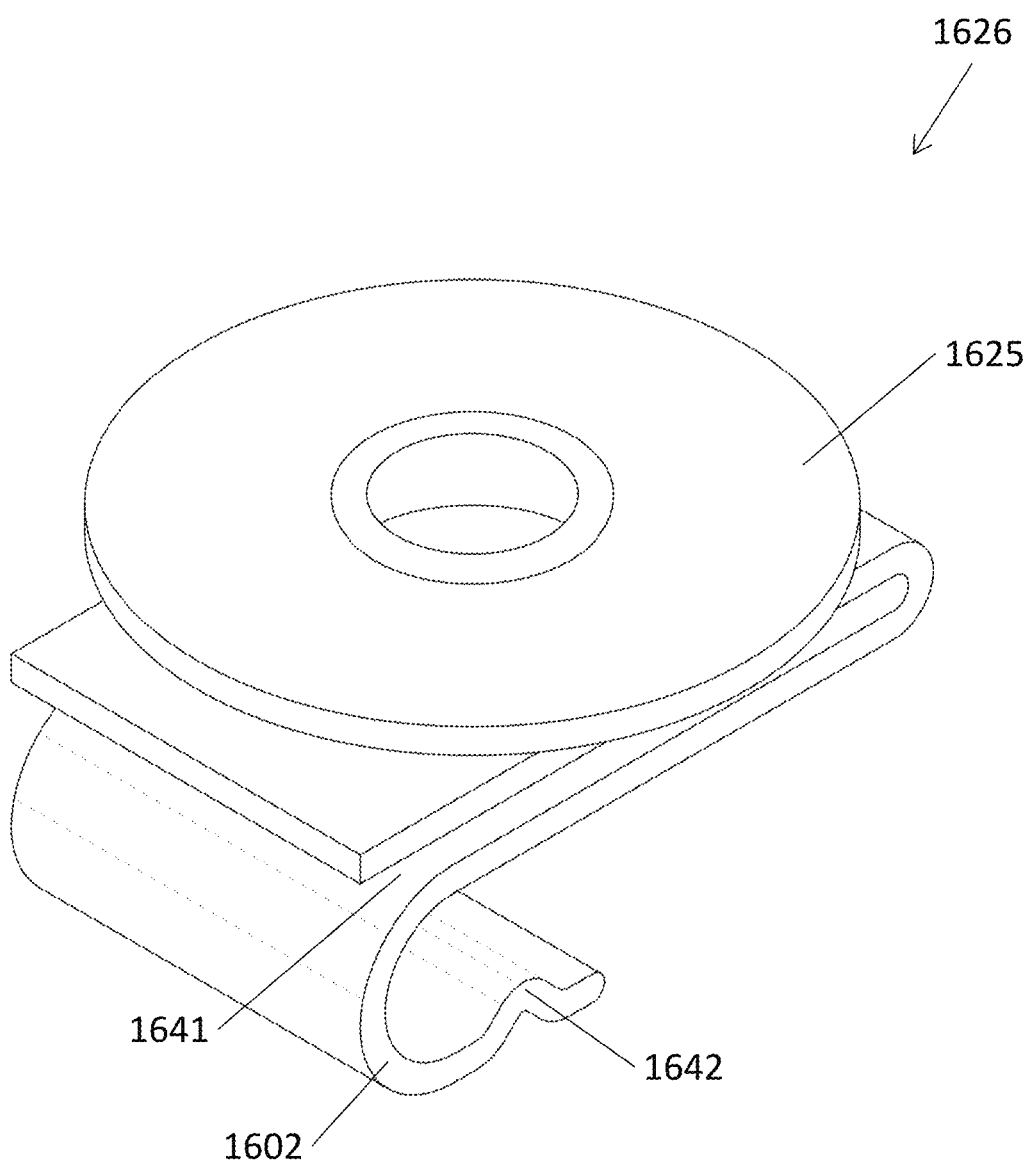
FIG. 16 is a perspective view of an attachment clip of the photovoltaic wire management system, according to an embodiment of the present invention.
Figure 17:
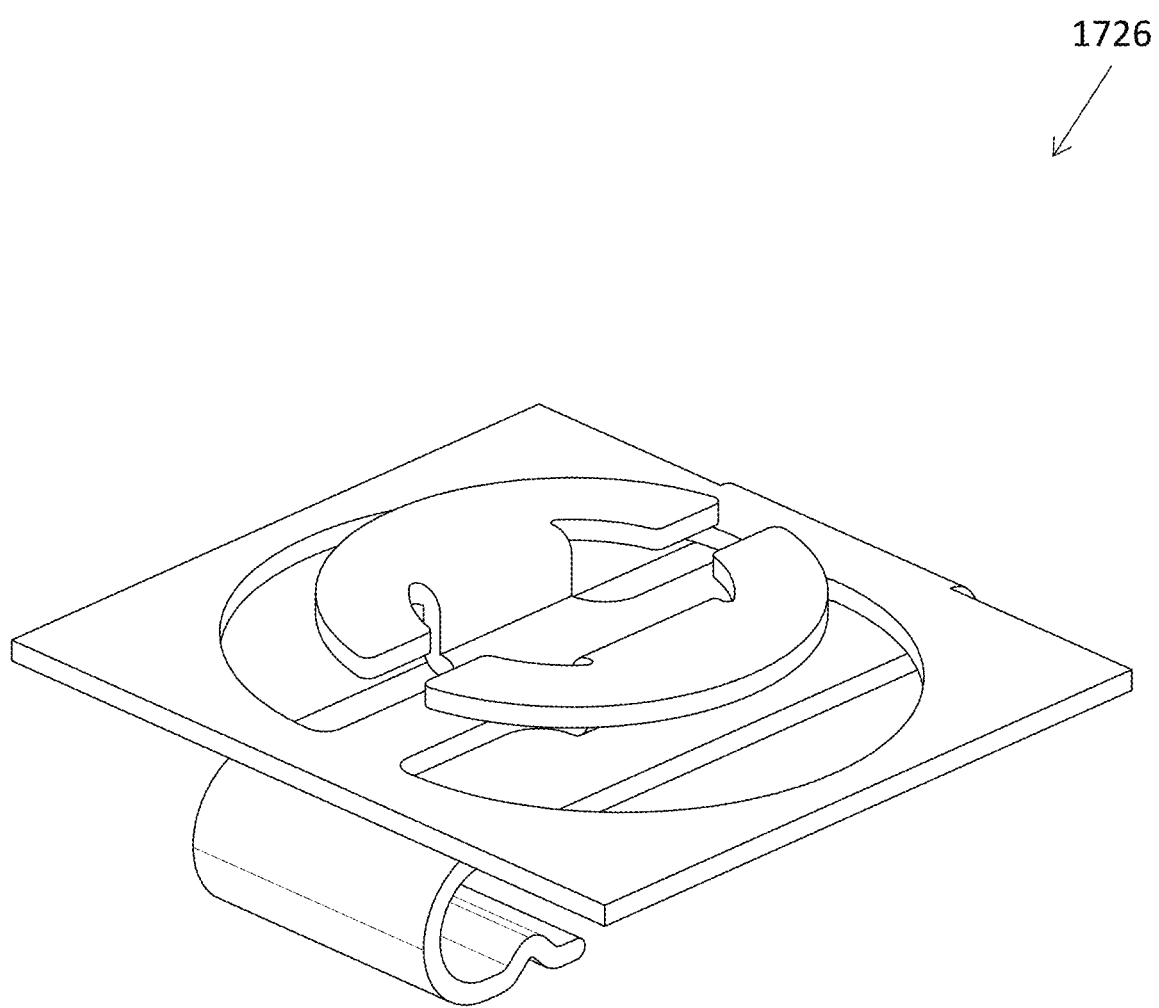
FIG. 17 is a perspective view of an attachment clip of the photovoltaic wire management system, according to an embodiment of the present invention.
Figure 18:
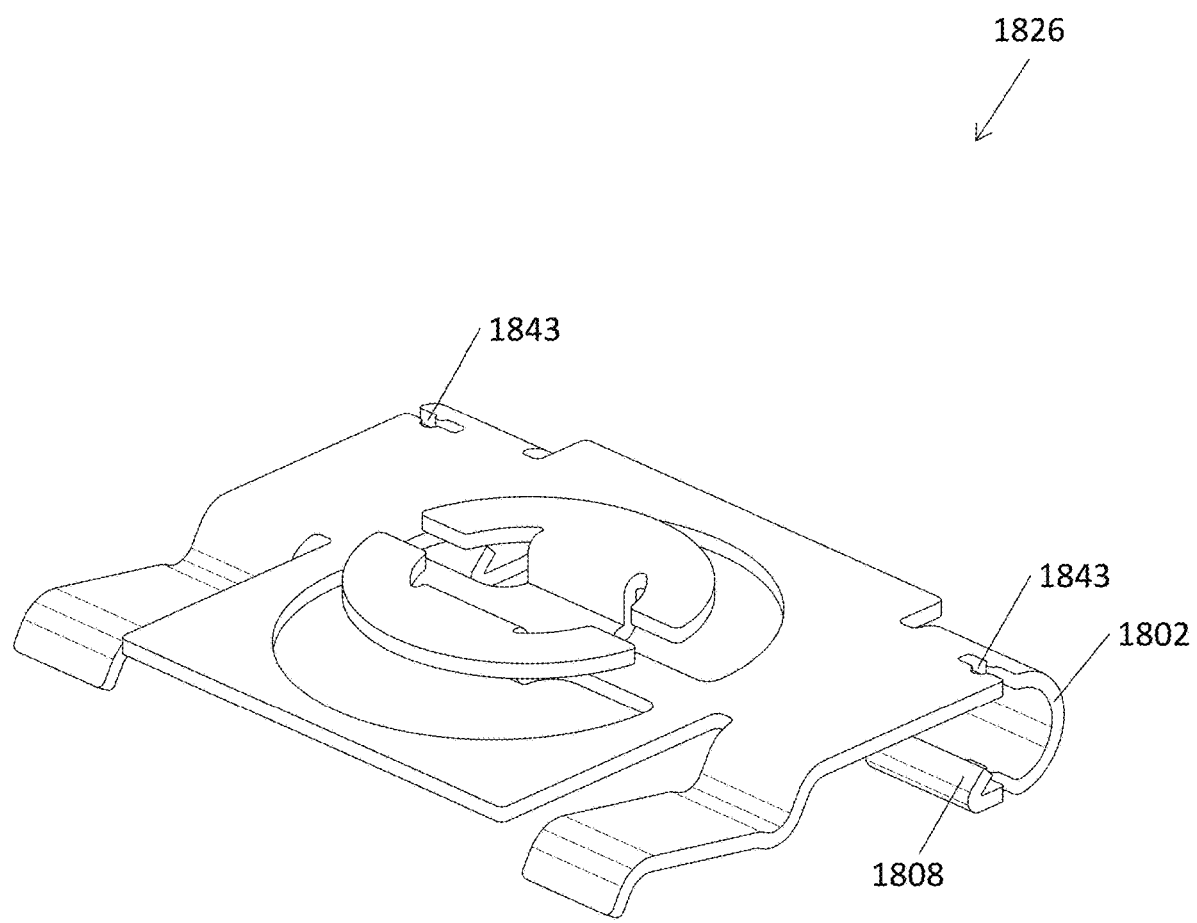
FIG. 18 is a perspective view of an attachment clip of the photovoltaic wire management system, according to an embodiment of the present invention.

In further reference to FIGS. 16-18, the mounting component is a mechanism for attaching photovoltaic equipment. In this embodiment, the mounting component is a clip 1626 comprising a slot 1641 to engage the frame of a photovoltaic module. Those skilled in the art will appreciate that wire management systems contemplated herein may use any number of the components described herein, including the mounting clips, to mount and install solar modules and their components. Stated another way, for purposes of brevity, the Figures and accompanying disclosure herein only show one set of mounting components, though others may be used as well. The slot 1641 may be provided with internal tangs or teeth to grip and further engage the module frame. In this embodiment, the clip 1626 is further provided a mounting lip 1602 to engage the ledge of a rail slot, such as is commonly found in photovoltaic mounting rails. The mounting lip 1602 may have a ridge 1642 or hook to act as a wedge to smoothly engage the ledge and lock the clip 1626 into place on the ledge.

With reference now to FIG. 18, another embodiment of the mounting component 1826 is shown. In this embodiment, the mounting lip 1802 terminates in a wedge-like hook 1808 to lock the clip 1826 into place on the ledge of a rail slot. In this embodiment, the clip 1826 is provided two toothed slots 1843 to engage and mount to flanges that are perpendicular to the wire management duct, such as those commonly found as wind dams in ballasted photovoltaic systems.

Figure 19:
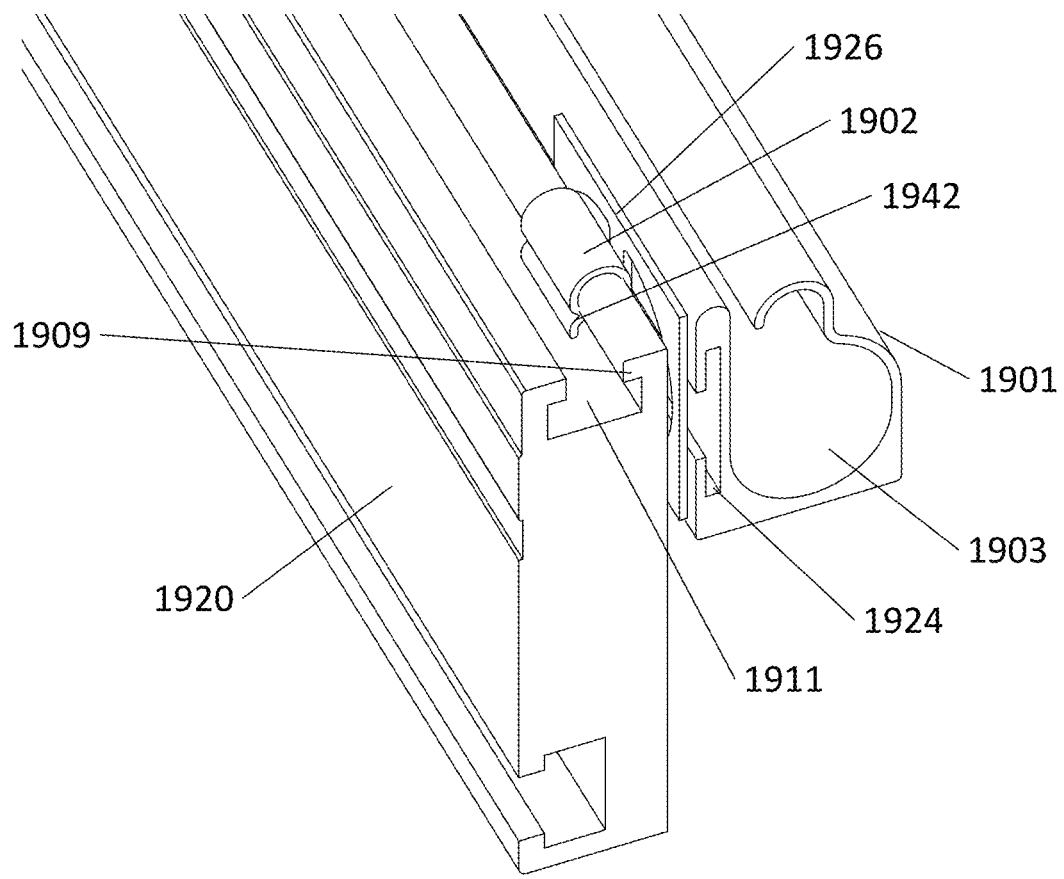
FIG. 19 is a perspective view of the photovoltaic wire management system in use, according to an embodiment of the present invention.

With reference to FIG. 19, an embodiment of the photovoltaic wire management system is shown in use. In the embodiment, the wire management duct 1901 has been mounted onto the mounting rail 1920 by sliding a mounting clip 1926 component into the grooves 1924 of the wire channel 1903 and placing the mounting lip 1902 of the mounting clip 1926 into the mounting rail slot 1911 so that the ridge 1942 engages with the with the ledge 1909 of the mounting rail slot 1911. In another embodiment, the hook (shown as 1808 in FIG. 18) of the mounting lip 1902 engages the ledge 1909.

Figure 20:
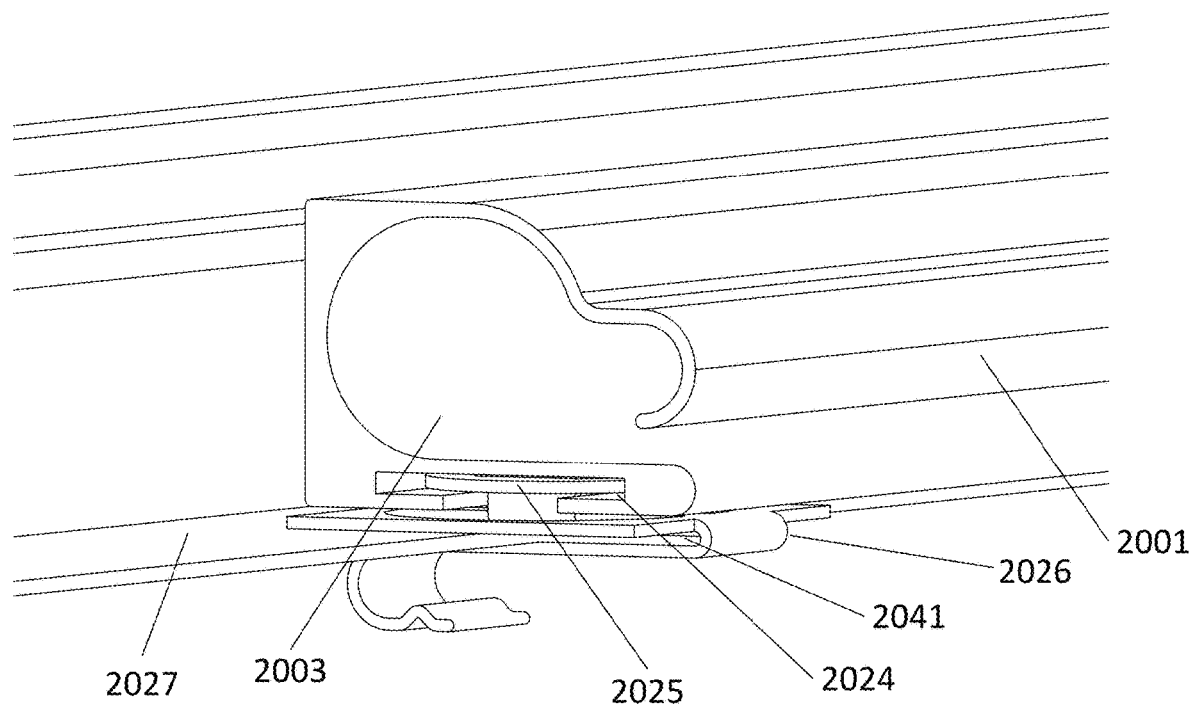
FIG. 20 is a perspective view of the photovoltaic wire management system in use, according to an embodiment of the present invention.

With reference to FIG. 20, an embodiment of the photovoltaic wire management system is shown in use. In the embodiment, the wire management duct 2001 is mounted onto the lower flange of a photovoltaic module frame 2027 with the wire management duct 2001 running above the flange. The mounting clip 2026 component(s) slide into the wire management duct 2001 with the tabs 2025 of the clip 2026 engaging grooves 2024 of the wire channel 2003 and the slot 2041 on the mounting clip 2026 engaging the lower flange of the module frame 2027. The mounting clip 2026 may slide to any position along the grooves of the wire channel, but is shown at the end of the wire management duct 2001 for clarity.

Figure 21:
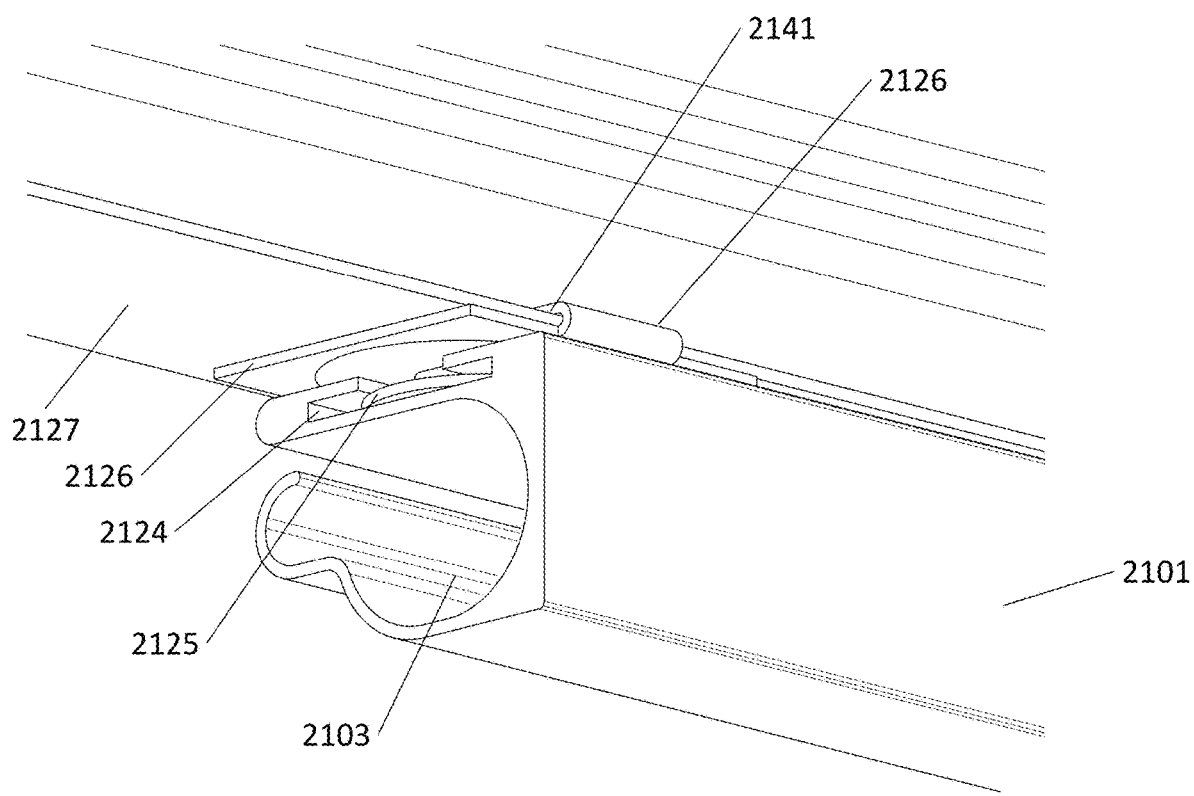
FIG. 21 is a perspective view of the photovoltaic wire management system in use, according to an embodiment of the present invention.

With reference to FIG. 21, an embodiment of the photovoltaic wire management system is shown in use. In the embodiment, the wire management duct 2101 is mounted onto the lower flange of a photovoltaic module frame 2127 with the wire management duct 2101 running below the flange. The mounting clip 2126 component(s) slide into the wire management duct 2101 with the tabs 2025 of the clip 2126 engaging grooves 2124 of the wire channel 2103 and the slot 2141 on the mounting clip 2126 engaging the lower flange of the module frame 2127. The mounting clip 2126 may slide to any position along the grooves of the wire channel, but is shown at the end of the wire management duct for clarity.

Figure 22:
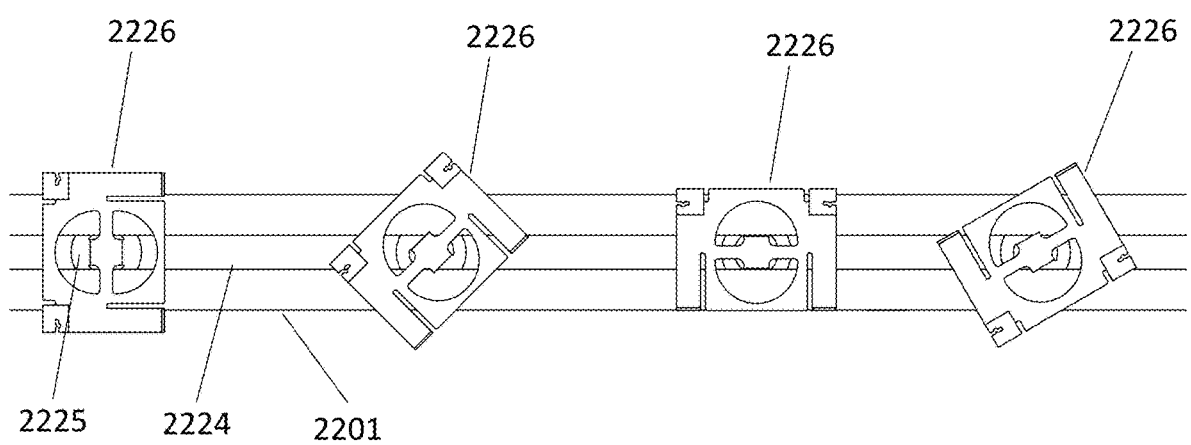
FIG. 22 is a top view of an attachment component of the photovoltaic wire management system in use and rotated to different orientations, according to an embodiment of the present invention.

With reference to FIG. 22, an embodiment of the mounting clip 2226 is shown in use. In this embodiment, four clips 2226 are shown. The tabs 2225 of each clip 2226 slide into different locations along the grooves 2224 on the wire management duct 2201 and rotated to different orientations. In this embodiment, the clips can be rotated a full 360 degrees and slid to any location along the grooves.

Figure 23:
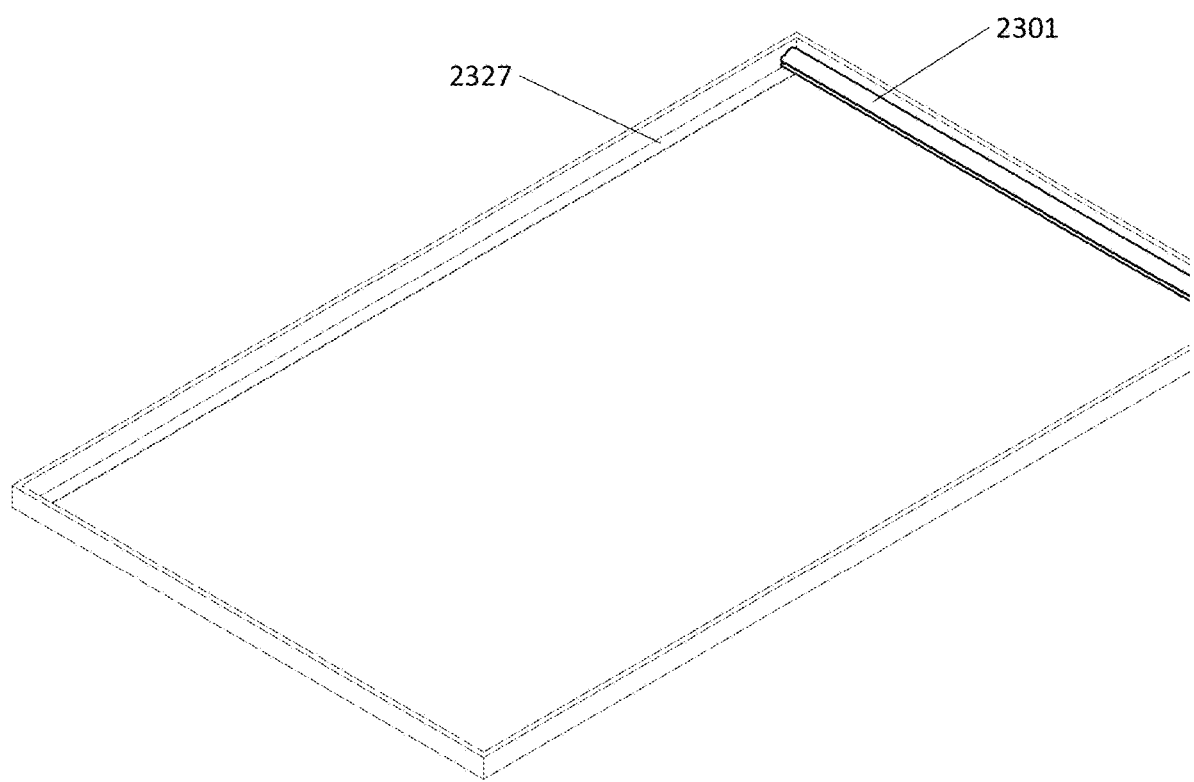
FIG. 23 is a perspective view of the photovoltaic wire management system in use, according to an embodiment of the present invention.

With reference to FIG. 23, an embodiment of the photovoltaic wire management system is shown in use. In the embodiment, mounting clips are used to mount the wire management duct 2301 onto the lower flange of a photovoltaic module frame 2327 with the duct running above the flange along the short side of the module frame. The duct may also be run below the flange of the module frame. In this figure, the glass of the photovoltaic module is not shown for clarity.

Figure 24:
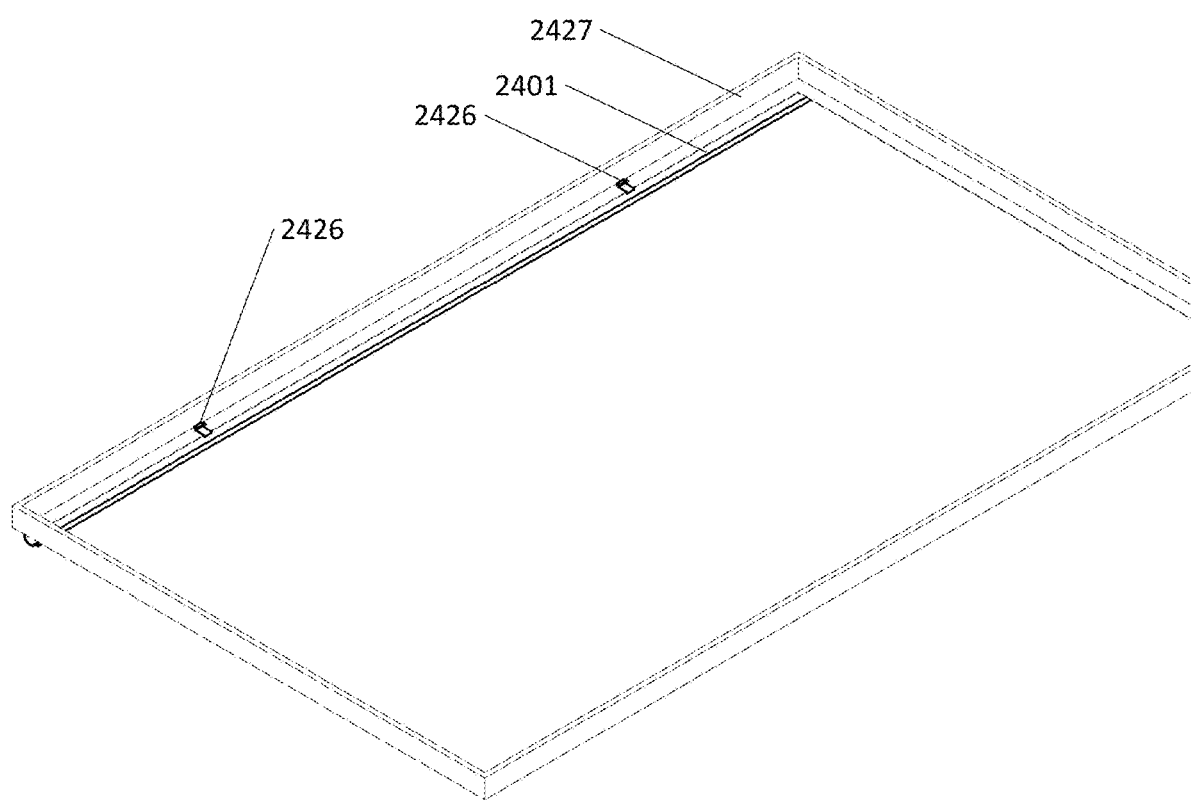
FIG. 24 is a perspective view of the photovoltaic wire management system in use, according to an embodiment of the present invention.

With reference to FIG. 24, an embodiment of the photovoltaic wire management system is shown in use. In the embodiment, mounting clips 2426 are used to mount the wire management duct 2401 onto the lower flange of a photovoltaic module frame 2427 with the management duct 2401 running below the flange along the long side of the module frame 2427. The management duct 2401 may also be run below the flange of the module frame 2427. In this figure, the glass of the photovoltaic module is not shown for clarity.

Figure 25:
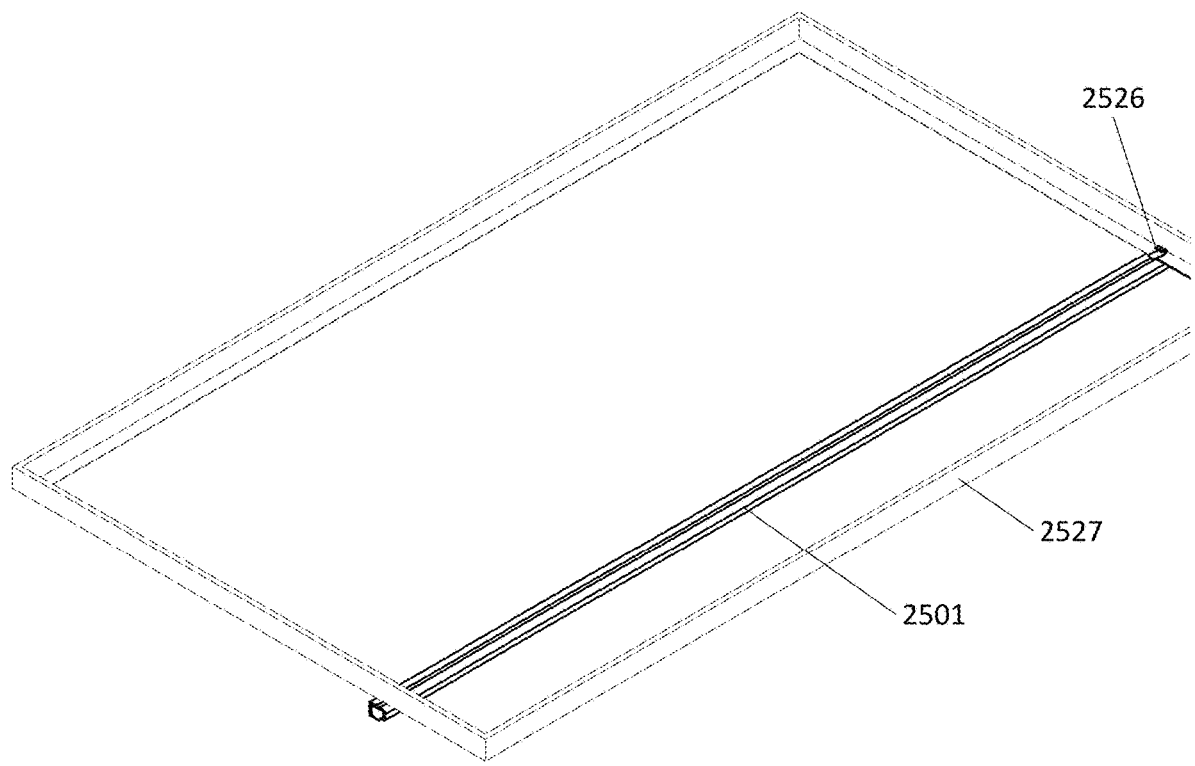
FIG. 25 is a perspective view of the photovoltaic wire management system in use, according to an embodiment of the present invention.

With reference to FIG. 25, an embodiment of the photovoltaic wire management system is shown in use. In the embodiment, mounting clips 2526 are used to mount the wire management duct onto the lower flange of a photovoltaic module frame 2527 with the duct 2501 spanning across the length of the module. In this figure, the glass of the photovoltaic module has been removed for clarity.

Figure 26:
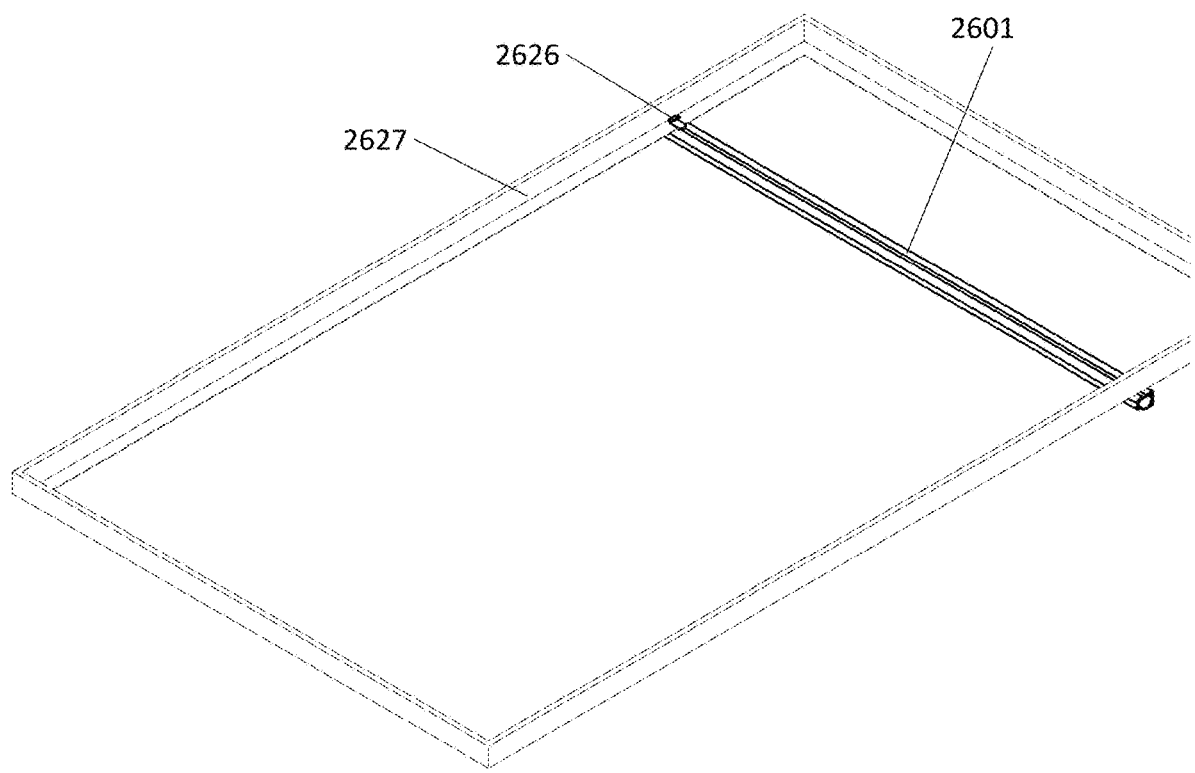
FIG. 26 is a perspective view of the photovoltaic wire management system in use, according to an embodiment of the present invention.

With reference to FIG. 26, an embodiment of the photovoltaic wire management system is shown in use. In this embodiment, mounting clips 2626 are used to mount the wire management duct 2601 onto the lower flange of a photovoltaic module frame 2627 with the management duct 2601 spanning across the width of the module. In this figure, the glass of the photovoltaic module is not shown for clarity.

Figure 27:
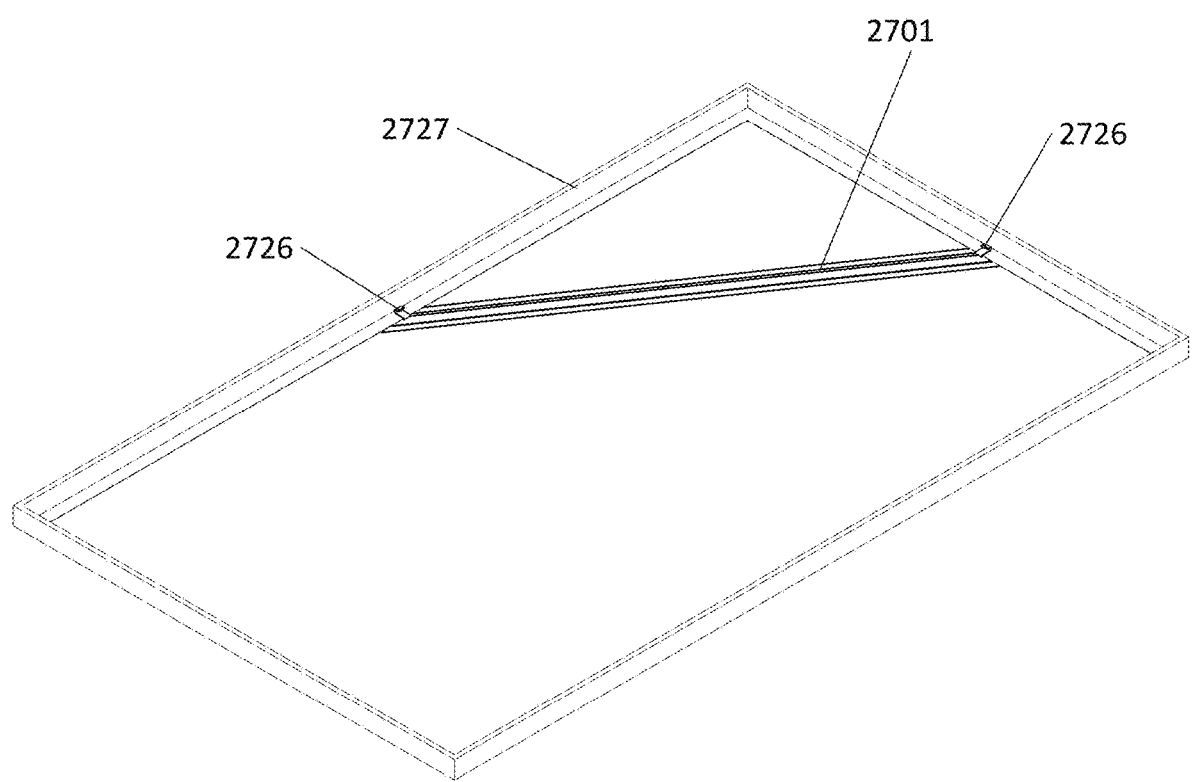
FIG. 27 is a perspective view of the photovoltaic wire management system in use, according to an embodiment of the present invention.

With reference to FIG. 27, an embodiment of the photovoltaic wire management system is shown in use. In the embodiment, mounting clips 2726 such as those contemplated in FIG. 15 are used (though alternative mounting clip designs may likewise be used) to mount the wire management duct 2701 onto the lower flange of a photovoltaic module frame 2727 with the management duct 2701 spanning across the module at an angle. In this figure, the glass of the photovoltaic module is not shown for clarity.

Figure 28:
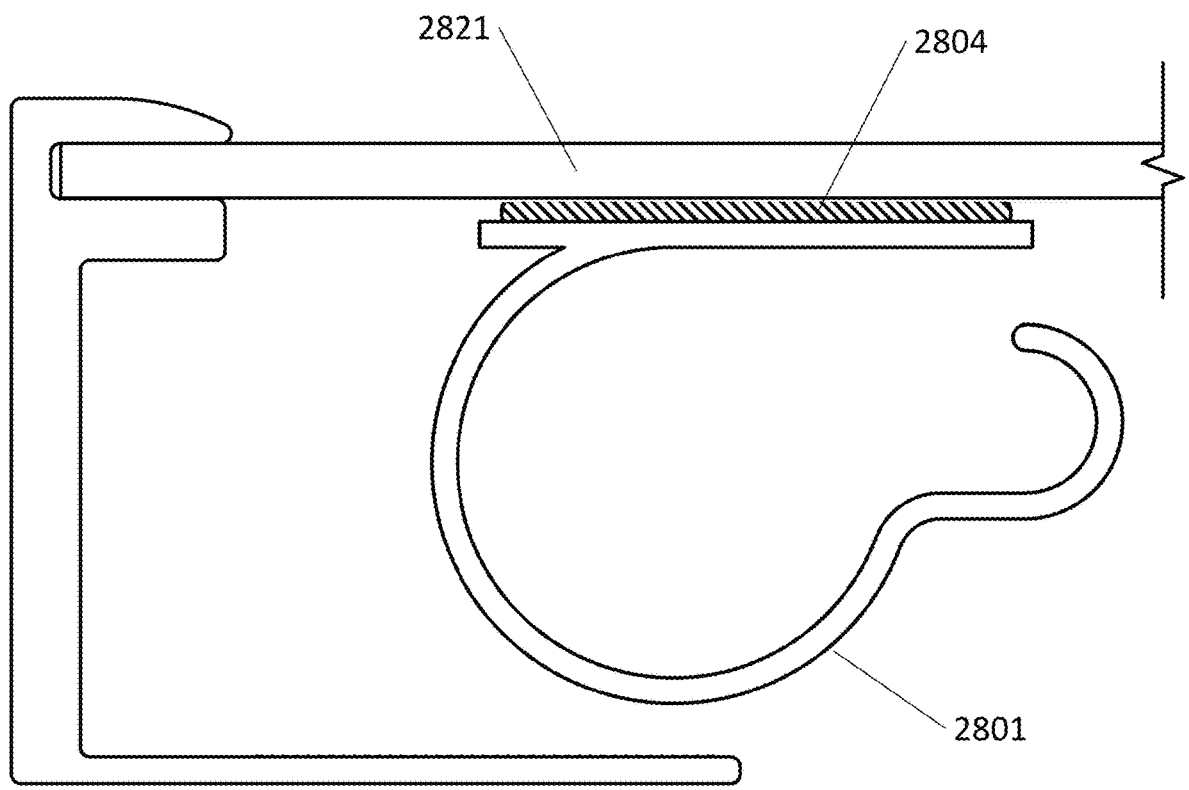
FIG. 28 is a side view of the photovoltaic wire management system in use, according to an embodiment of the present invention.

With reference to FIG. 28, in an embodiment, the wire management duct 2801 may be secured to the photovoltaic module backsheet 2821, or other module components with an adhesive or adhesive backing 2804. The adhesives maybe any conventional or as yet unknown adhesives.

Figure 29:
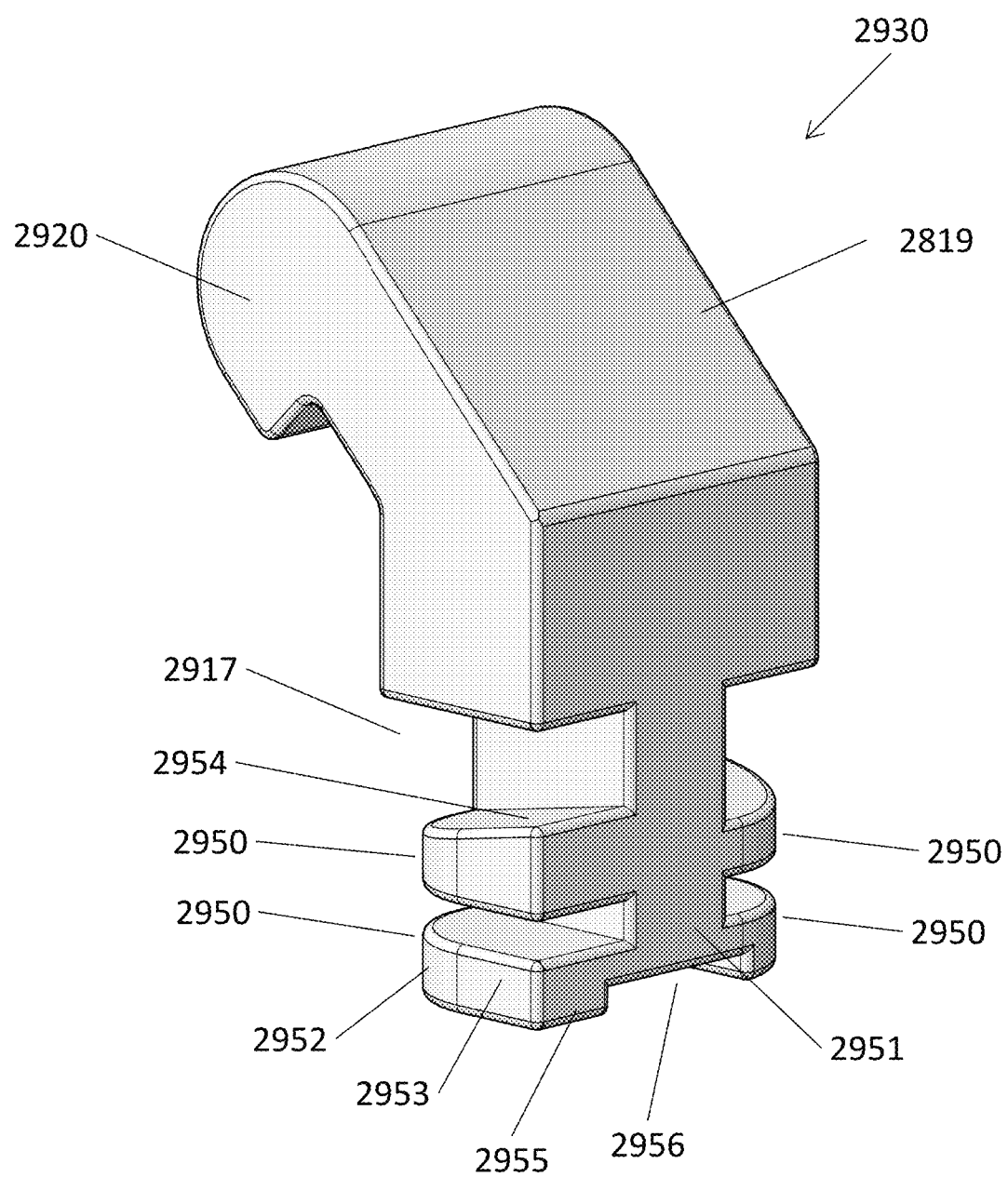
FIG. 29 is a perspective view of an attachment clip of the photovoltaic wire management system, according to an embodiment of the present invention.

With reference to FIG. 29, an embodiment of a perpendicular attachment clip 2930 is shown. The clip 2930 is provided with a rail slot adaptor 2917 and a duct adaptor 2920. In the embodiment, the rail slot adaptor 2917 is provided to be inserted into a rail slot of a rail mounting system. The duct adapter 2920 is provided to engage the mounting lip of the wire management duct. In an embodiment, the clip 2930 is further provided with an angled support shelf 2819 to support the wire management duct.

With continuing reference to FIG. 29, the rail slot adaptor 2917 may comprise flexible wings 2950 attached to a central shaft 2951. The wings 2950 are provided with corresponding radiused corners 2952 and flat edges 2953. The upper surface of the upper wings 2950 are provided with wedge-shaped pads 2954. The lower surface of the lower wings 2950 are provided with flat pads 2955 that form a void 2956 below the shaft. In use, the clip 2930 is lowered into the rail slot at the desired location, then rotated. The radiused corners 2952 of the wings 2950 allow the clip 2930 to rotate inside the slot. As the clip 2930 is rotated further, the wedged shaped pads 2954 push against the top of the rail mounting channel and transfer increasing downward pressure to the central shaft. This pressure forces the shaft into the void below the shaft and between the lower flat pads 2955 and the lower wings 2950 flex upwards. This pressure locks the clip 2930 in place. When the clip 2930 is fully rotated, the corresponding flat edges on the wings 2950 contact the sides of the rail slot thus preventing further rotation.

Figure 30:
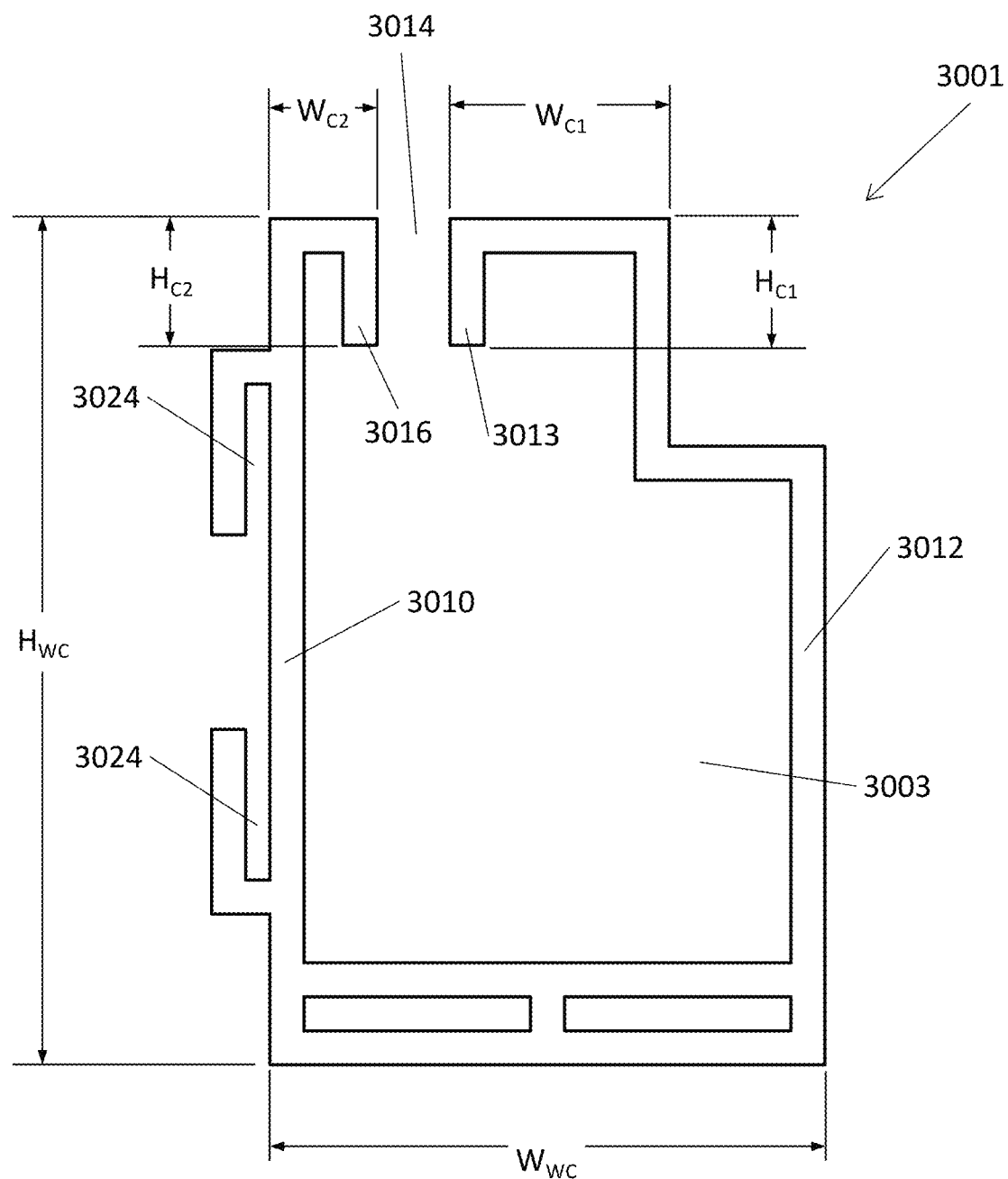
FIG. 30 is a side view of the photovoltaic wire management system, according to an embodiment of the present invention.

With reference to FIG. 30, another embodiment of the wire management duct 3001 is shown. In this embodiment, the wire channel and the catches are provided with generally straight, as opposed to curved, opening catches, though combinations of straight and curved are contemplated herein. For example, a straight wire channel 3003, a first straight opening catch 3013, and a second straight opening catch 3016 with an opening 3014 between the catches are provided. The straight wire channel 3003, first straight opening catch 3013, and the second straight opening catch 3016 each have a profile defining their relative size. For example, the straight wire channel profile may be defined by a width ($W_{wc}$) and a height ($H_{wc}$), the first straight opening catch profile may be defined by a width ($W_{c1}$) and a height ($H_{c1}$), and the second straight opening catch profile may be defined by a width ($W_{c2}$) and a height ($H_{c2}$). Angles, radii and other dimensions may further define the profiles. In the illustrated embodiment, the opening catches form a square hook on the interior of the wire channel 3003 to prevent wires or cables from accidentally falling out of the channel 3003.

With continuing reference to FIG. 30, a bottom portion 3012 of the wire channel 3003 is formed by a straight edge and the opening catch 3013 is formed by a smaller straight edge and are constructed of such a material and thickness so as to form a flexible spring-like structure that flexes outwards, increasing the size of the opening 3014. The wire channel 3003 has a wire channel profile larger than the first straight opening catch profile and the second straight opening catch profile.

As wires or cables are inserted into the opening 3014, the elasticity of the structure causes it to flex back towards its original position, applying inward pressure to retain and secure the wires. This structure provides a means for the wires to span from their point of origin on modules or MLPE, to the wire management system without sagging or secondary means of securement.

Figure 31:
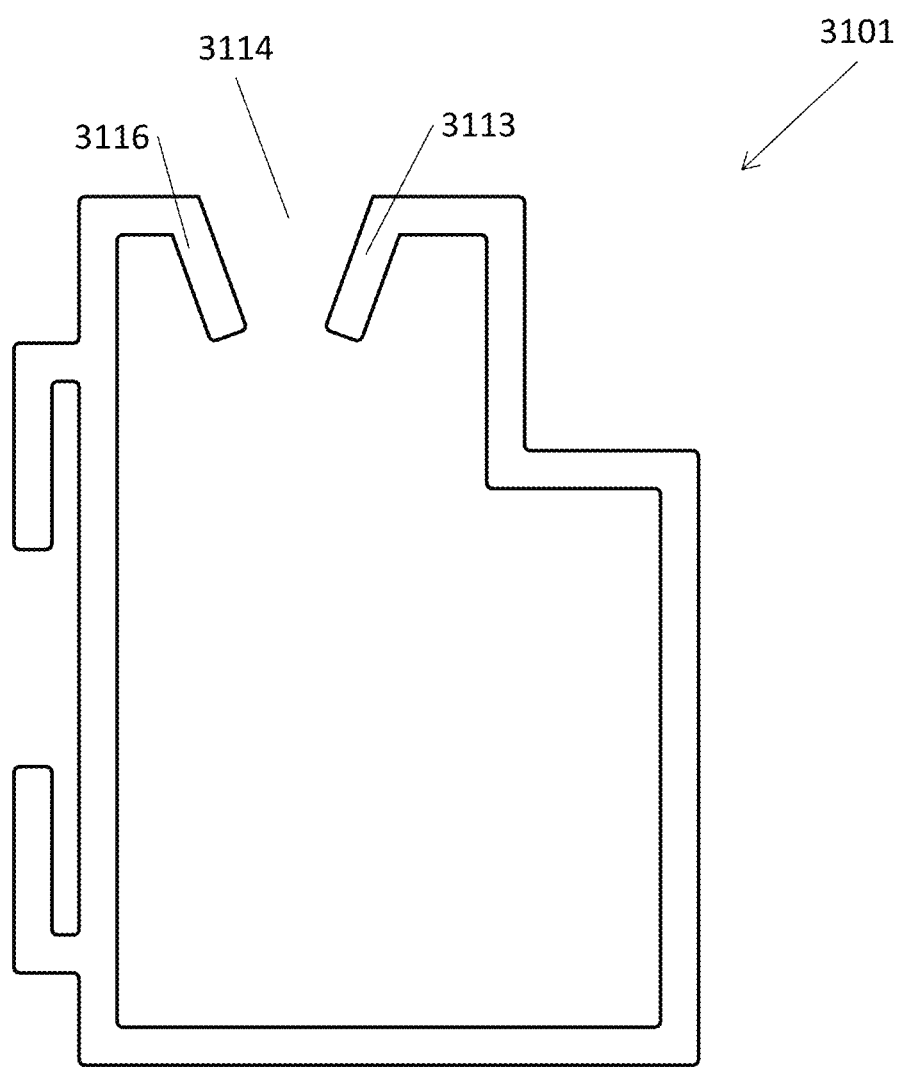
FIG. 31 is a side view of the photovoltaic wire management system, according to an embodiment of the present invention.

With reference to FIG. 31, another embodiment of the wire management duct 3101 is shown wherein the corners are radiused. In this embodiment, the straight edge of the first opening catch 3113 and the second opening catch 3116 is angled so as to form a V-shaped opening 3114 between the catches.

Figure 32:
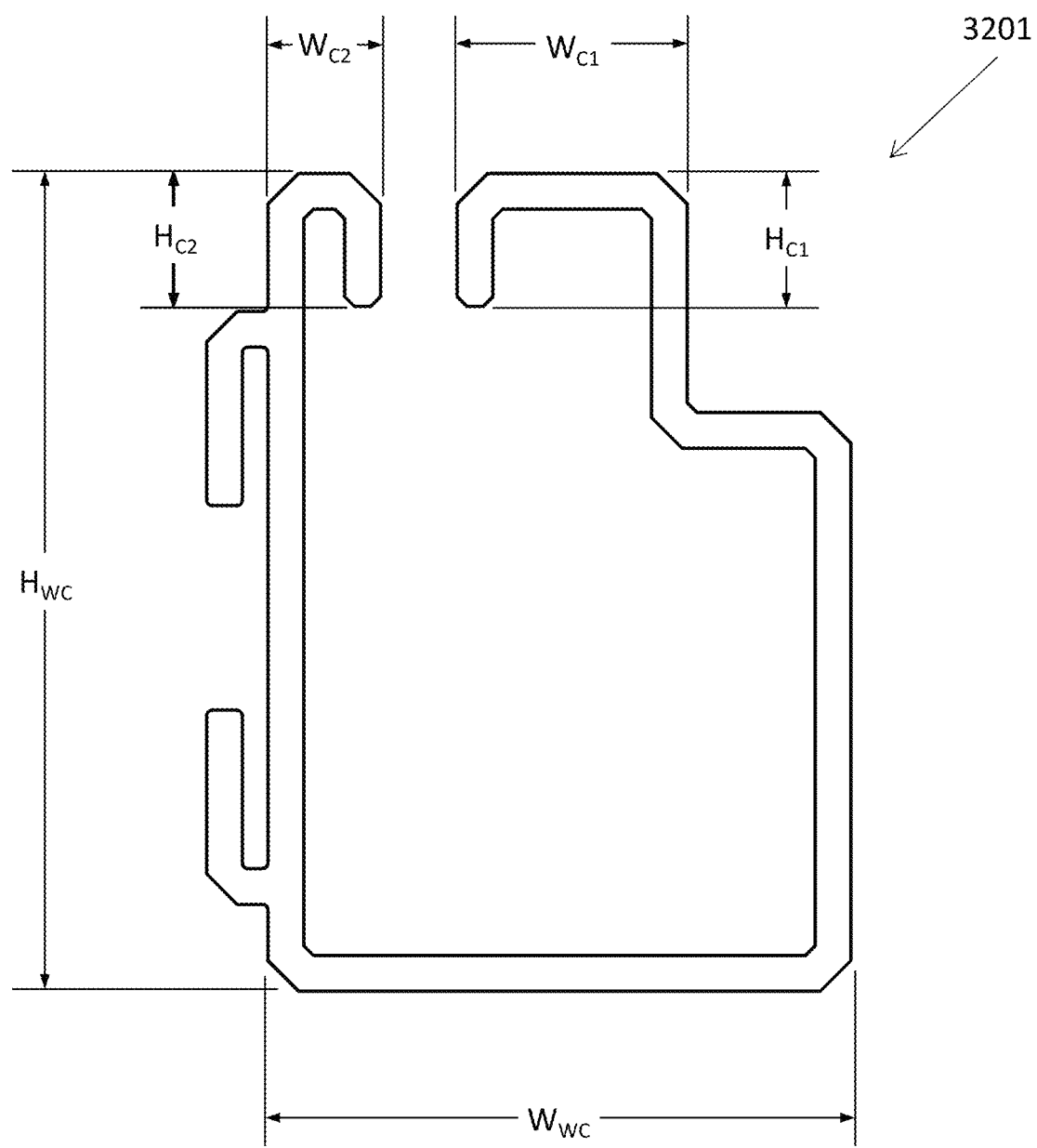
FIG. 32 is a side view of the photovoltaic wire management system, according to an embodiment of the present invention.

With reference to FIG. 32, another embodiment of the wire management duct 3201 is shown wherein the corners are chamfered.

Figure 33:
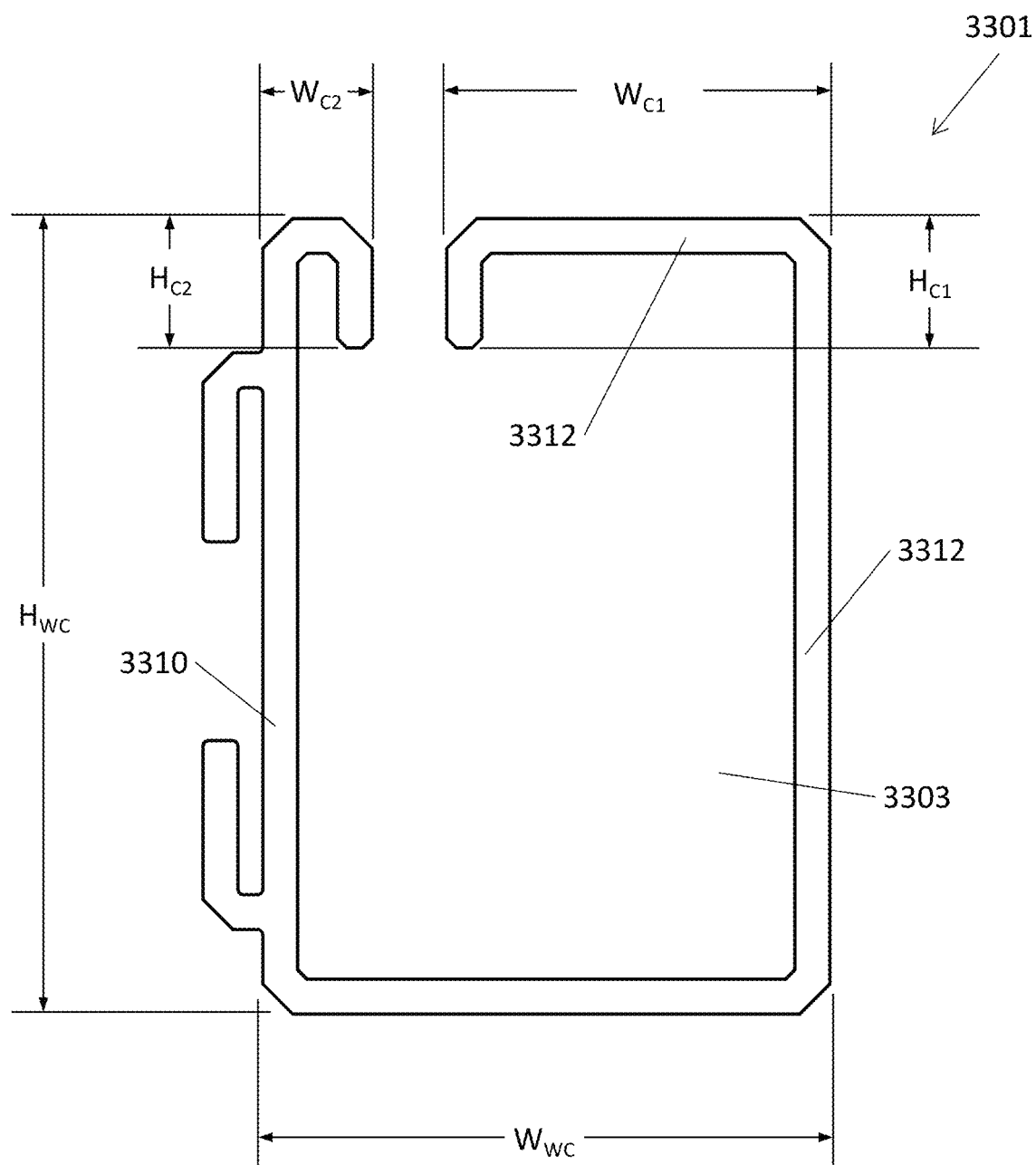
FIG. 33 is a side view of the photovoltaic wire management system, according to an embodiment of the present invention.

With reference to FIG. 33, another embodiment of the wire management duct 3301 is shown wherein the wire channel 3303 is formed by straight edges 3312 to maximize the volume of the channel without increasing the overall footprint of the duct.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

The invention claimed is:

1. A wire management system comprising:
a wire management duct having a length;
a wire channel provided along the length and configured to hold a plurality of wires, the wire channel further having a channel wall, a first opening catch having a first opening catch radius and a second opening catch having a second opening catch radius, and an opening provided between the first opening catch and the second opening catch, wherein a portion of the wire channel is formed by a first arc having a first radius and the first radius is larger than the first opening catch radius and the second opening catch radius; and
an attachment clip connection mechanism.

2. The wire management system of claim 1, wherein the first opening catch radius and the second opening catch radius are at least one of the same and different.

3. The wire management system of claim 1, wherein a width (W) of the wire management duct is less than about 25 millimeters.

4. The wire management system of claim 1, wherein the channel wall further comprises an adhesive backing, wherein the adhesive backing is configured to mount the wire management duct to at least one of:
a photovoltaic mounting rail;
a photovoltaic module frame; and
a photovoltaic module backsheet.

5. The wire management system of claim 1, wherein the channel wall further comprises at least one of a support truss and thickened sections.

6. The wire management system of claim 1, wherein the attachment clip connection mechanism comprises at least one of tabs and tab grooves.

7. The wire management system of claim 6, wherein an attachment clip is configured to mount the wire management duct to at least one of a photovoltaic module frame and a photovoltaic mounting rail in at least one of a fixed angle and a variable angle.

8. The wire management system of claim 1, wherein the wire channel further comprises at least one slotted cutout perpendicular to the length of the wire management duct.

9. A wire management system comprising:
a wire management duct having a length;
a wire channel provided along the length and configured to hold a plurality of wires, the wire channel further having a channel wall, a first opening catch having a first opening catch radius and an opening provided between the channel wall and the first opening catch, wherein a portion of the wire channel is formed by a first arc having a first radius and the first radius is larger than the first opening catch radius;
the wire management duct having an attachment clip connection mechanism; and
an attachment clip, wherein the attachment clip that connects to the wire management duct via the attachment clip connection mechanism.

10. The wire management system of claim 9, further comprising a second opening catch having a second opening catch radius.

11. The wire management system of claim 10, wherein the first radius is larger than the second opening catch radius.

12. The wire management system of claim 9, wherein the attachment clip connection mechanism comprises tab grooves and the attachment clip comprises tabs configured to insert into the tab grooves.

13. The wire management system of claim 9, wherein the attachment clip connection mechanism comprises tabs and the attachment clip comprises tab grooves configured to receive the tab grooves.

14. The wire management system of claim 9, wherein the attachment clip is configured to mount the wire management duct to at least one of a photovoltaic module frame and a photovoltaic mounting rail in at least one of a fixed angle and a variable angle.

15. The wire management system of claim 9, wherein the wire channel further comprises at least one slotted cutout perpendicular to the length of the wire management duct.

16. The wire management system of claim 9, wherein the channel wall further comprises an adhesive backing, wherein the adhesive backing is configured to mount the wire management duct to at least one of:
a photovoltaic mounting rail;
a photovoltaic module frame; and
a photovoltaic module backsheet.

17. The wire management system of claim 9, wherein the channel wall further comprises at least one of a support truss and thickened sections.

18. The wire management system of claim 9, wherein the attachment clip comprises an adhesive backing.

19. A wire management system comprising:
a wire management duct having a length;
a wire channel provided along the length and configured to hold a plurality of wires, the wire channel further having a channel wall, a first straight opening catch having a first straight opening catch profile and an opening provided between the channel wall and the first straight opening catch, wherein a portion of the wire channel has a wire channel profile, wherein the wire channel profile is larger than the first straight opening catch profile;
the wire management duct having an attachment clip connection mechanism; and
an attachment clip, wherein the attachment clip that connects to the wire management duct via the attachment clip connection mechanism.

20. The wire management system of claim 19, further comprising a second straight opening catch having a second straight opening catch profile, wherein the first straight opening catch profile is larger or than the second straight opening catch profile.

21. The wire management system of claim 19, wherein the attachment clip connection mechanism comprises tab grooves and the attachment clip comprises tabs configured to insert into the tab grooves.

22. The wire management system of claim 19, wherein the attachment clip connection mechanism comprises tabs and the attachment clip comprises tab grooves configured to receive the tab grooves.

23. The wire management system of claim 19, wherein the attachment clip is configured to mount the wire management duct to at least one of a photovoltaic module frame and a photovoltaic mounting rail in at least one of a fixed angle and a variable angle.

24. The wire management system of claim 19, wherein the channel wall further comprises an adhesive backing, wherein the adhesive backing is configured to mount the wire management duct to at least one of:
a photovoltaic mounting rail;
a photovoltaic module frame; and
a photovoltaic module backsheet.

25. The wire management system of claim 19, wherein the attachment clip comprises an adhesive backing.

26. The wire management system of claim 20, wherein edges of the first straight opening catch and the second straight opening catch are angled to form a V-shaped opening.

27. The wire management system of claim 19, wherein at least one corner of the wire management duct is at least one of chamfered and radiused.

* * * * *